United States Patent
Cheng et al.

(10) Patent No.: US 12,245,241 B2
(45) Date of Patent: Mar. 4, 2025

(54) RANDOM ACCESS CHANNEL (RACH)-LESS PROCEDURE

(71) Applicants: QUALCOMM Incorporated, San Diego, CA (US); Peng Cheng, Beijing (CN); Ozcan Ozturk, San Diego, CA (US); Karthika Paladugu, San Diego, CA (US); Huichun Liu, Beijing (CN); Gavin Bernard Horn, La Jolla, CA (US); Masato Kitazoe, Tokyo (JP); Linhai He, San Diego, CA (US); Punyaslok Purkayastha, San Diego, CA (US)

(72) Inventors: Peng Cheng, Beijing (CN); Ozcan Ozturk, San Diego, CA (US); Karthika Paladugu, San Diego, CA (US); Huichun Liu, Beijing (CN); Gavin Bernard Horn, La Jolla, CA (US); Masato Kitazoe, Tokyo (JP); Linhai He, San Diego, CA (US); Punyaslok Purkayastha, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 471 days.

(21) Appl. No.: 17/309,292

(22) PCT Filed: Oct. 31, 2019

(86) PCT No.: PCT/CN2019/114620
§ 371 (c)(1),
(2) Date: May 17, 2021

(87) PCT Pub. No.: WO2020/103664
PCT Pub. Date: May 28, 2020

(65) Prior Publication Data
US 2022/0015131 A1 Jan. 13, 2022

(30) Foreign Application Priority Data

Nov. 20, 2018 (WO) ................ PCT/CN2018/116437

(51) Int. Cl.
*H04W 72/23* (2023.01)
*H04L 5/00* (2006.01)
(Continued)

(52) U.S. Cl.
CPC .......... *H04W 72/23* (2023.01); *H04L 5/0055* (2013.01); *H04W 36/00725* (2023.05);
(Continued)

(58) Field of Classification Search
CPC ............. H04W 72/23; H04W 36/0072; H04W 72/1268; H04W 74/04; H04W 36/00;
(Continued)

(56) References Cited

U.S. PATENT DOCUMENTS

2014/0349694 A1* 11/2014 Raghothaman ....... H04W 40/22
455/509
2015/0318974 A1* 11/2015 Hou ...................... H04W 28/18
370/280
(Continued)

FOREIGN PATENT DOCUMENTS

WO   2018059438 A1   4/2018
WO   2018129300 A1   7/2018
(Continued)

OTHER PUBLICATIONS

ETSI TS 138 331 V15.3.0, Oct. 2018), 8 pages (Year: 2018).*
(Continued)

*Primary Examiner* — Sharmin Chowdhury
(74) *Attorney, Agent, or Firm* — Harrity & Harrity, LLP

(57) ABSTRACT

Various aspects of the present disclosure generally relate to wireless communication. In some aspects, a base station
(Continued)

may determine to transmit a pre-allocated uplink (UL) grant to a user equipment (UE), wherein the pre-allocated UL grant includes: a secondary node (SN) transmission configuration indicator (TCI) list, and a type 1 configured grant (CG). The base station may transmit, to the UE, the pre-allocated UL grant based at least in part on determining to transmit the pre-allocated UL grant. Numerous other aspects are provided.

27 Claims, 16 Drawing Sheets

(51) Int. Cl.
*H04W 36/00* (2009.01)
*H04W 72/1268* (2023.01)
*H04W 74/04* (2009.01)
*H04L 1/1812* (2023.01)

(52) U.S. Cl.
CPC ....... *H04W 72/1268* (2013.01); *H04W 74/04* (2013.01); *H04L 1/1812* (2013.01); *H04L 5/0048* (2013.01)

(58) Field of Classification Search
CPC ... H04L 5/0055; H04L 1/1812; H04L 5/0048; H04L 1/1671; H04L 1/1896
See application file for complete search history.

(56) References Cited

U.S. PATENT DOCUMENTS

| | | | |
|---|---|---|---|
| 2016/0219475 A1* | 7/2016 | Kim | H04W 76/15 |
| 2016/0227562 A1 | 8/2016 | Huang et al. | |
| 2016/0381611 A1* | 12/2016 | Uchino | H04W 36/0061 |
| | | | 370/331 |
| 2018/0279185 A1 | 9/2018 | Wu | |
| 2019/0261427 A1* | 8/2019 | Comstock | H04W 76/20 |
| 2019/0297537 A1* | 9/2019 | Tsai | H04W 36/0016 |
| 2019/0297547 A1* | 9/2019 | Tsai | H04L 5/0048 |
| 2019/0306924 A1* | 10/2019 | Zhang | H04B 7/063 |
| 2021/0168894 A1* | 6/2021 | Sha | H04L 5/0053 |
| 2022/0278732 A1* | 9/2022 | Xu | H04L 5/0057 |
| 2023/0164871 A1* | 5/2023 | Jung | H04W 12/0433 |
| | | | 370/328 |

FOREIGN PATENT DOCUMENTS

WO  WO-2018123025 A1 * 7/2018
WO  2018204863 A1  11/2018

OTHER PUBLICATIONS

"3rd Generation Partnership Project; Technical Specification Group Radio Access Network; NR; Medium Access Control (MAC) protocol specification (Release 15)", 3GPP Standard, Technical Specification, 3GPP TS 38.321, 3rd Generation Partnership Project (3GPP), Mobile Competence Centre, 650, Route Des Lucioles, F-06921 Sophia-Antipolis Cedex, France, vol. RAN WG2, No. V15.3.0, Sep. 25, 2018 (Sep. 25, 2018), pp. 1-76, XP051487371, [retrieved on Sep. 25, 2018] * chapter 6.1.3.17 *.
International Search Report and Written Opinion—PCT/CN2018/116437—ISA/EPO—Aug. 26, 2019.
International Search Report and Written Opinion—PCT/CN2019/114620—ISA/EPO—Feb. 6, 2020.
Qualcomm Incorporated: "RACH-Less HO Design Considerations", 3GPP TSG-RAN WG2 meeting #105, 3GPP Draft, R2-1900363, 3rd Generation Partnership Project (3GPP), Mobile Competence Centre, 650, Route Des Lucioles, F-06921 Sophia-Antipolis Cedex, France, vol. Ran WG2, No. Athens, Greece, Feb. 25, 2019-Mar. 1, 2019, 3 Pages, Feb. 15, 2019 (Feb. 15, 2019), XP051601759, Retrieved from the Internet: URL: http://www.3gpp.org/ftp/tsg%5Fran/WG2%5FRL2/TSGR2%5F105/Docs/R2%2D1900363%2Ezip [retrieved on Feb. 15, 2019].
Supplementary European Search Report—EP19888040—Search Authority—The Hague—Jul. 4, 2022.

* cited by examiner

RANDOM ACCESS CHANNEL (RACH)-LESS PROCEDURE

CROSS-REFERENCE TO RELATED APPLICATIONS

This application is a 371 national stage of PCT Application No. PCT/CN2019/114620 filed on Oct. 31, 2019, entitled "RANDOM ACCESS CHANNEL (RACH)-LESS PROCEDURE," which claims priority to Patent Cooperation Treaty (PCT) Application No. PCT/CN2018/116437, filed on Nov. 20, 2018, entitled "RANDOM ACCESS CHANNEL (RACH)-LESS PROCEDURE," which are hereby expressly incorporated by reference herein.

FIELD OF THE DISCLOSURE

Aspects of the present disclosure generally relate to wireless communication, and more particularly to techniques and apparatuses for a random access channel (RACH)-less procedure.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a pre-allocated uplink (UL) grant from a first base station (BS), wherein the pre-allocated UL grant includes: a secondary node (SN) transmission configuration indicator (TCI) list, and a type 1 configured grant (CG); and transmitting, to a second BS, an initial physical uplink shared channel (PUSCH) transmission based at least in part on receiving the pre-allocated UL grant, wherein the initial PUSCH transmission is based at least in part on a selected TCI from the TCI list.

In some aspects, a UE for wireless communication may include memory and one or more processors operatively coupled to the memory. The memory and the one or more processors may be configured to receive a pre-allocated uplink (UL) grant from a first base station (BS), wherein the pre-allocated UL grant includes: a secondary node (SN) transmission configuration indicator (TCI) list, and a type 1 configured grant (CG); and transmit, to a second BS, an initial physical uplink shared channel (PUSCH) transmission based at least in part on receiving the pre-allocated UL grant, wherein the initial PUSCH transmission is based at least in part on a selected TCI from the TCI list.

In some aspects, a non-transitory computer-readable medium may store one or more instructions for wireless communication. The one or more instructions, when executed by one or more processors of a UE, may cause the one or more processors to receive a pre-allocated uplink (UL) grant from a first base station (BS), wherein the pre-allocated UL grant includes: a secondary node (SN) transmission configuration indicator (TCI) list, and a type 1 configured grant (CG); and transmit, to a second BS, an initial physical uplink shared channel (PUSCH) transmission based at least in part on receiving the pre-allocated UL grant, wherein the initial PUSCH transmission is based at least in part on a selected TCI from the TCI list.

In some aspects, an apparatus for wireless communication may include means for receiving a pre-allocated uplink (UL) grant from a first apparatus, wherein the pre-allocated UL grant includes: a secondary node (SN) transmission configuration indicator (TCI) list, and a type 1 configured grant (CG); and means for transmitting, to a second apparatus, an initial physical uplink shared channel (PUSCH) transmission based at least in part on receiving the pre-allocated UL grant, wherein the initial PUSCH transmission is based at least in part on a selected TCI from the TCI list.

In some aspects, a method of wireless communication, performed by a base station (BS), may include determining to transmit a pre-allocated uplink (UL) grant to a user equipment (UE), wherein the pre-allocated UL grant includes: a secondary node (SN) transmission configuration indicator (TCI) list, and a type 1 configured grant (CG); and transmitting, to the UE, the pre-allocated UL grant based at least in part on determining to transmit the pre-allocated UL grant.

In some aspects, a base station for wireless communication may include memory and one or more processors operatively coupled to the memory. The memory and the one or more processors may be configured to determine to transmit a pre-allocated uplink (UL) grant to a user equipment (UE), wherein the pre-allocated UL grant includes: a secondary node (SN) transmission configuration indicator (TCI) list, and a type 1 configured grant (CG); and transmit, to the UE, the pre-allocated UL grant based at least in part on determining to transmit the pre-allocated UL grant.

In some aspects, a non-transitory computer-readable medium may store one or more instructions for wireless communication. The one or more instructions, when executed by one or more processors of a base station, may cause the one or more processors to determine to transmit a pre-allocated uplink (UL) grant to a user equipment (UE), wherein the pre-allocated UL grant includes: a secondary node (SN) transmission configuration indicator (TCI) list, and a type 1 configured grant (CG); and transmit, to the UE, the pre-allocated UL grant based at least in part on determining to transmit the pre-allocated UL grant.

In some aspects, an apparatus for wireless communication may include means for determining to transmit a pre-allocated uplink (UL) grant to another apparatus, wherein the pre-allocated UL grant includes: a secondary node (SN) transmission configuration indicator (TCI) list, and a type 1 configured grant (CG); and means for transmitting, to the other apparatus, the pre-allocated UL grant based at least in part on determining to transmit the pre-allocated UL grant.

In some aspects, a method of wireless communication, performed by a first base station (BS), may include transmitting, to a second BS, at least one of: a handover request acknowledgement (ACK), or a secondary node (SN) addition request ACK; and receiving, from a user equipment (UE), an initial physical uplink shared channel (PUSCH) transmission based at least in part on transmitting the at least one of the handover request ACK or the SN addition request ACK, wherein the initial PUSCH transmission is based at least in part on a selected transmission configuration indicator (TCI) from a list of TCIs.

In some aspects, a first base station (BS) for wireless communication may include memory and one or more processors operatively coupled to the memory. The memory and the one or more processors may be configured to transmit, to a second BS, at least one of: a handover request acknowledgement (ACK), or a secondary node (SN) addition request ACK; and receive, from a user equipment (UE), an initial physical uplink shared channel (PUSCH) transmission based at least in part on transmitting the at least one of the handover request ACK or the SN addition request ACK, wherein the initial PUSCH transmission is based at least in part on a selected transmission configuration indicator (TCI) from a list of TCIs.

In some aspects, a non-transitory computer-readable medium may store one or more instructions for wireless communication. The one or more instructions, when executed by one or more processors of a first base station (BS), may cause the one or more processors to transmit, to a second BS, at least one of: a handover request acknowledgement (ACK), or a secondary node (SN) addition request ACK; and receive, from a user equipment (UE), an initial physical uplink shared channel (PUSCH) transmission based at least in part on transmitting the at least one of the handover request ACK or the SN addition request ACK, wherein the initial PUSCH transmission is based at least in part on a selected transmission configuration indicator (TCI) from a list of TCIs.

In some aspects, a first apparatus for wireless communication may include means for transmitting, to a second apparatus, at least one of: a handover request acknowledgement (ACK), or a secondary node (SN) addition request ACK; and means for receiving, from a third apparatus, an initial physical uplink shared channel (PUSCH) transmission based at least in part on transmitting the at least one of the handover request ACK or the SN addition request ACK, wherein the initial PUSCH transmission is based at least in part on a selected transmission configuration indicator (TCI) from a list of TCIs.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
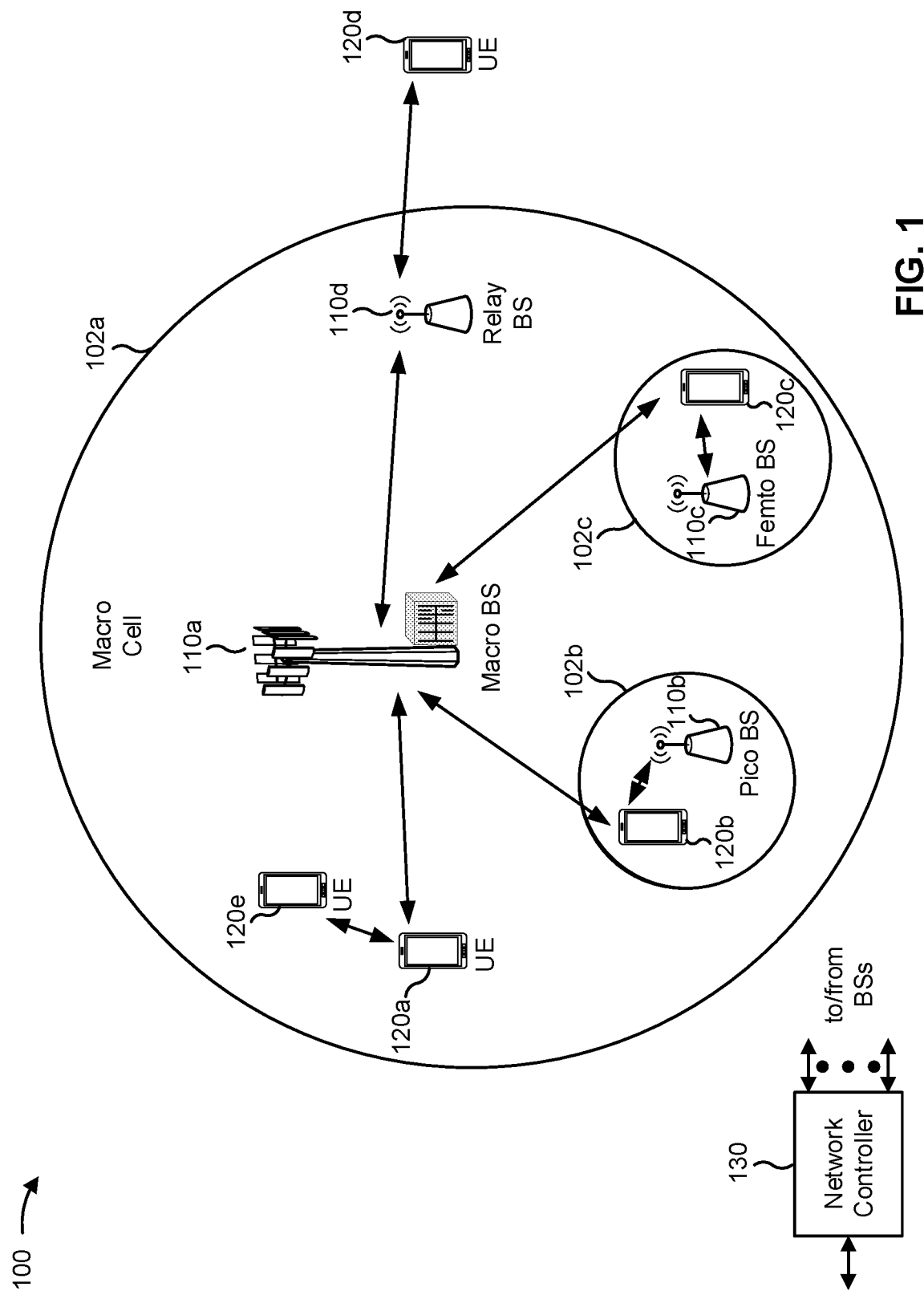
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. ABS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband interne of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what was described with regard to FIG. 1.

Figure 2:
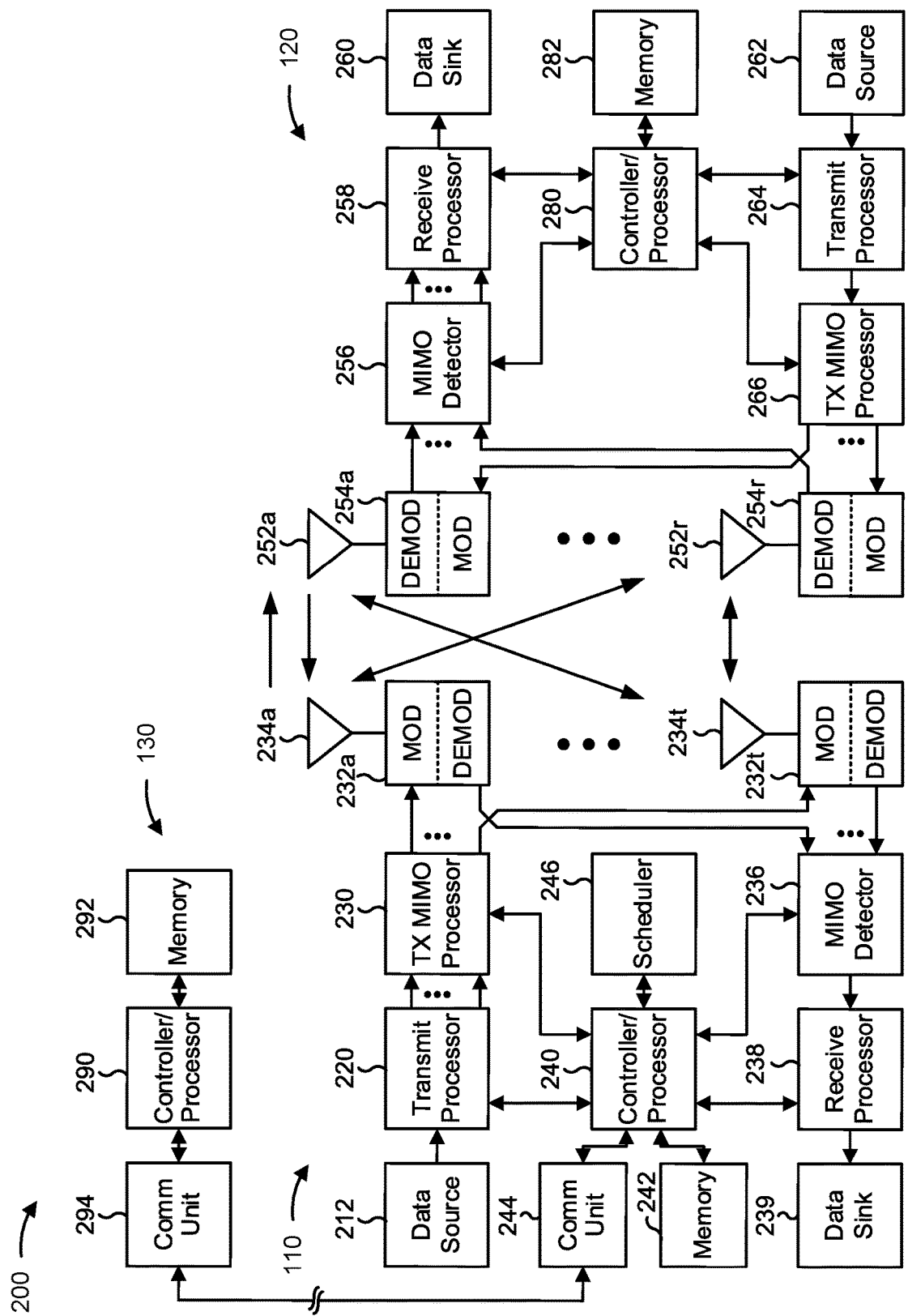
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with a random access channel (RACH)-less procedure, as described in more detail elsewhere herein. For example, controller/processor 240 of base station 110, controller/processor 280 of UE 120, and/or any other component(s) of FIG. 2 may perform or direct operations of, for example, process 1300 of FIG. 13, process 1400 of FIG. 14, process 1500 of FIG. 15, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving a pre-allocated uplink (UL) grant from a first base station (BS) 110, wherein the pre-allocated UL grant includes: a secondary node (SN) transmission configuration indicator (TCI) list, and a type 1 configured grant (CG), means for transmitting, to a second BS 110, an initial physical uplink shared channel (PUSCH) transmission based at least in part on receiving the pre-allocated UL grant, wherein the initial PUSCH transmission is based at least in part on a selected TCI from the TCI list, and/or the like. In some aspects, such means may include one or more components of UE 120 described in connection with FIG. 2.

In some aspects, BS 110 may include means for determining to transmit a pre-allocated uplink (UL) grant to UE 120, wherein the pre-allocated UL grant includes: a secondary node (SN) transmission configuration indicator (TCI) list, and a type 1 configured grant (CG), means for transmitting, to the UE, the pre-allocated UL grant based at least in part on determining to transmit the pre-allocated UL grant, and/or the like. In some aspects, such means may include one or more components of BS 110 described in connection with FIG. 2.

In some aspects, a first BS 110 may include means for transmitting, to a second BS 110, at least one of: a handover request acknowledgement (ACK), or a secondary node (SN) addition request ACK, means for receiving, from UE 120, an initial physical uplink shared channel (PUSCH) transmission based at least in part on transmitting the at least one of the handover request ACK or the SN addition request ACK, wherein the initial PUSCH transmission is based at least in part on a selected transmission configuration indicator (TCI) from a list of TCIs, and/or the like. In some aspects, such means may include one or more components of BS 110 described in connection with FIG. 2.

As indicated above, FIG. 2 is provided merely as an example. Other examples may differ from what was described with regard to FIG. 2.

Figure 3A:
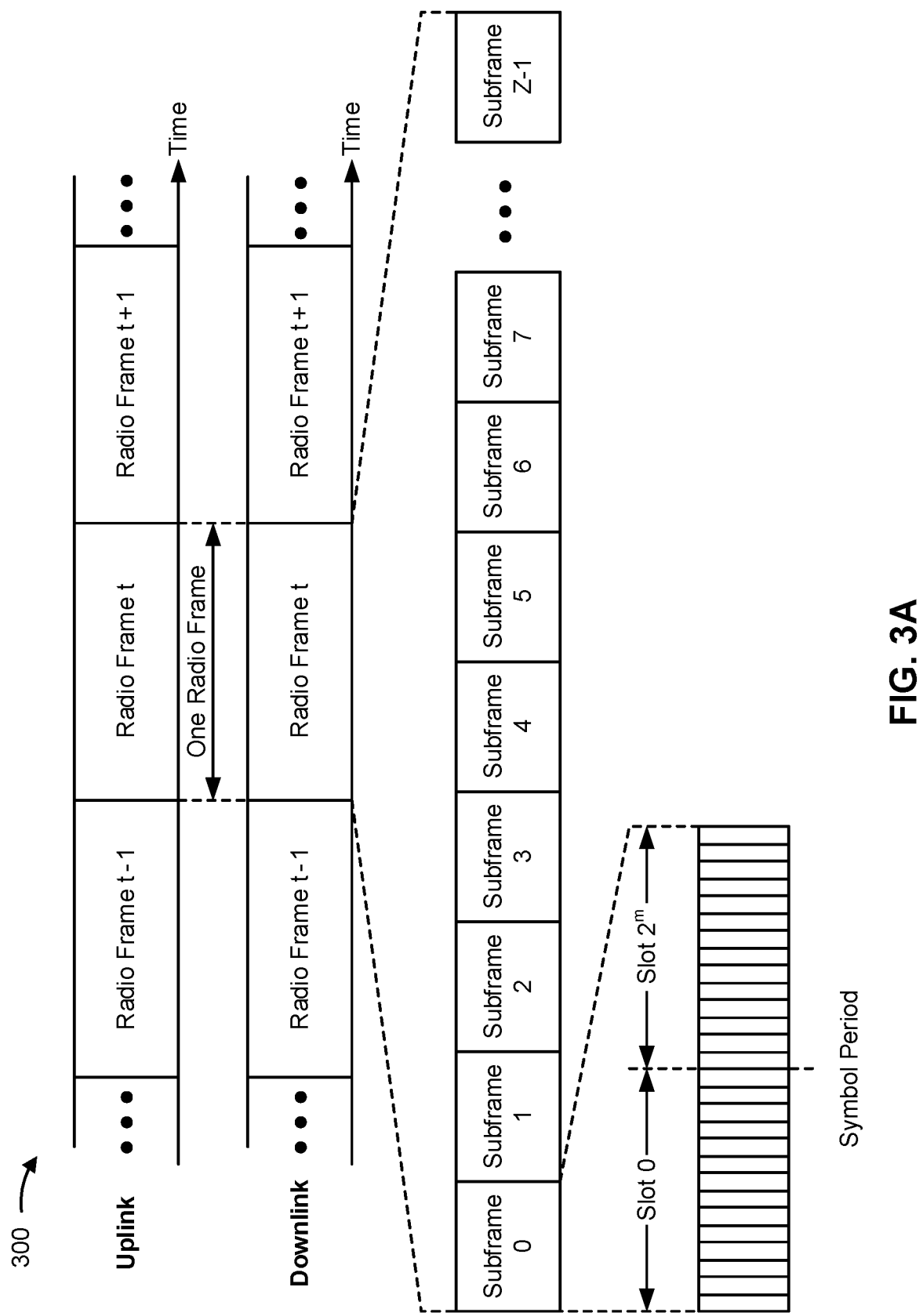
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
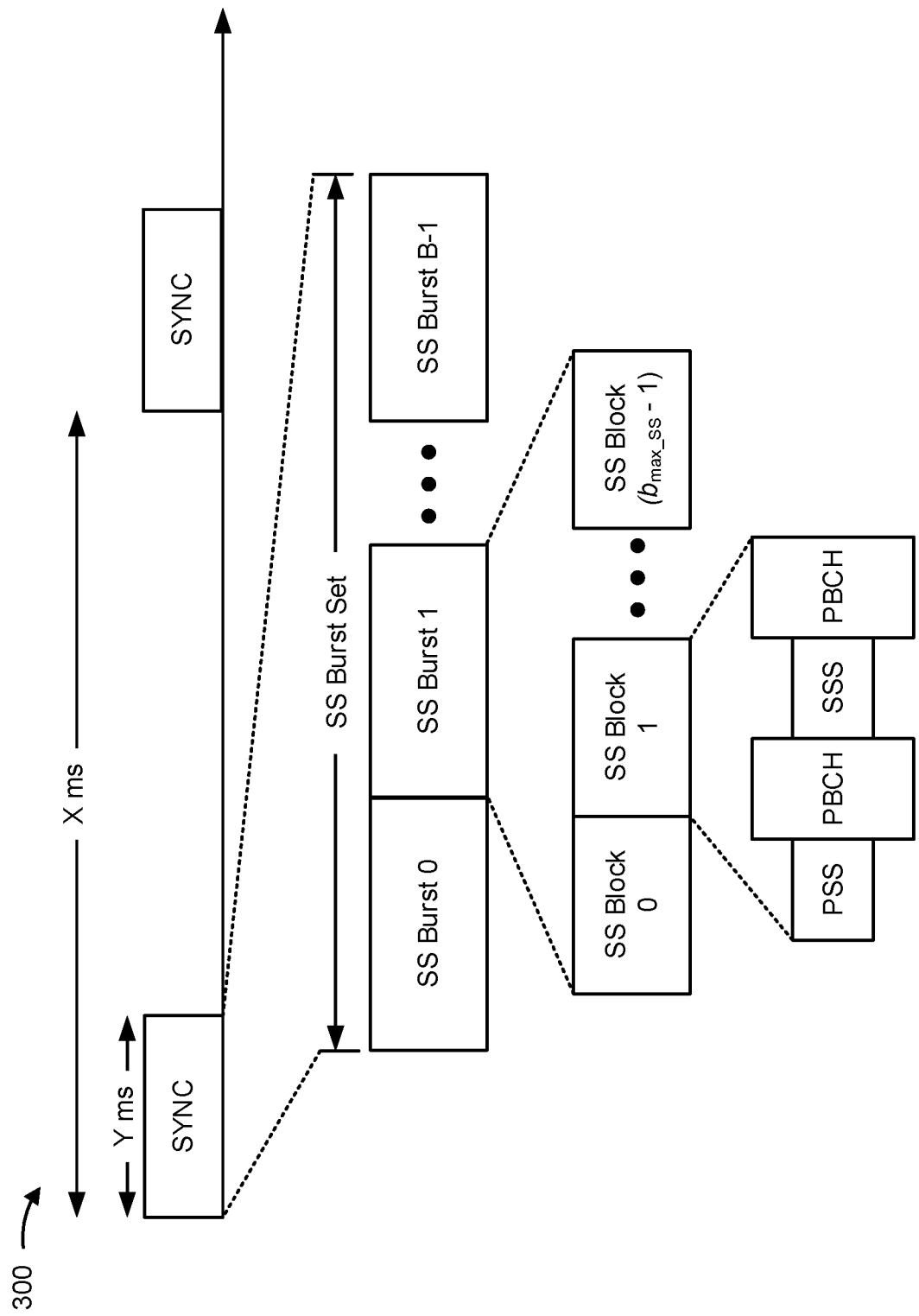
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what was described with regard to FIGS. 3A and 3B.

Figure 4:
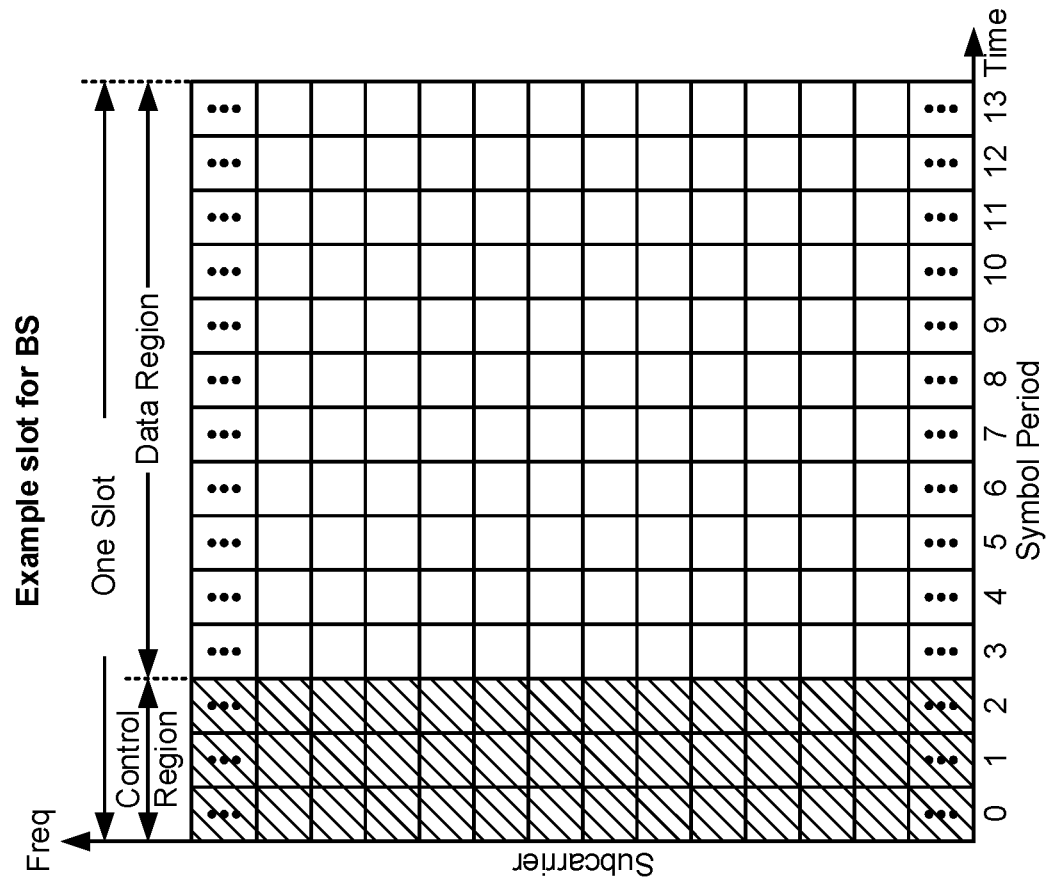
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q E {0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what was described with regard to FIG. 4.

Figure 5:
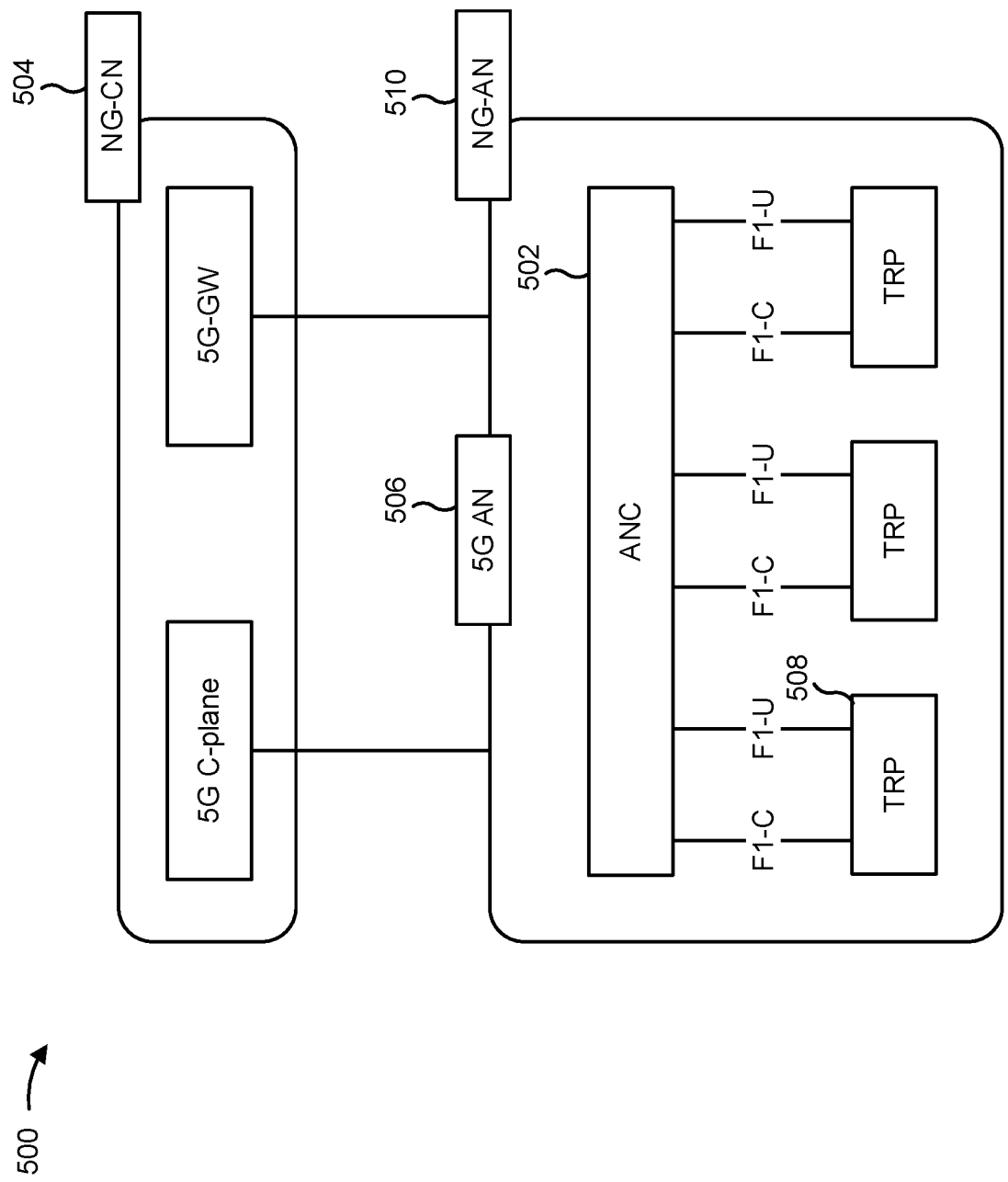
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples may differ from what was described with regard to FIG. 5.

Figure 6:
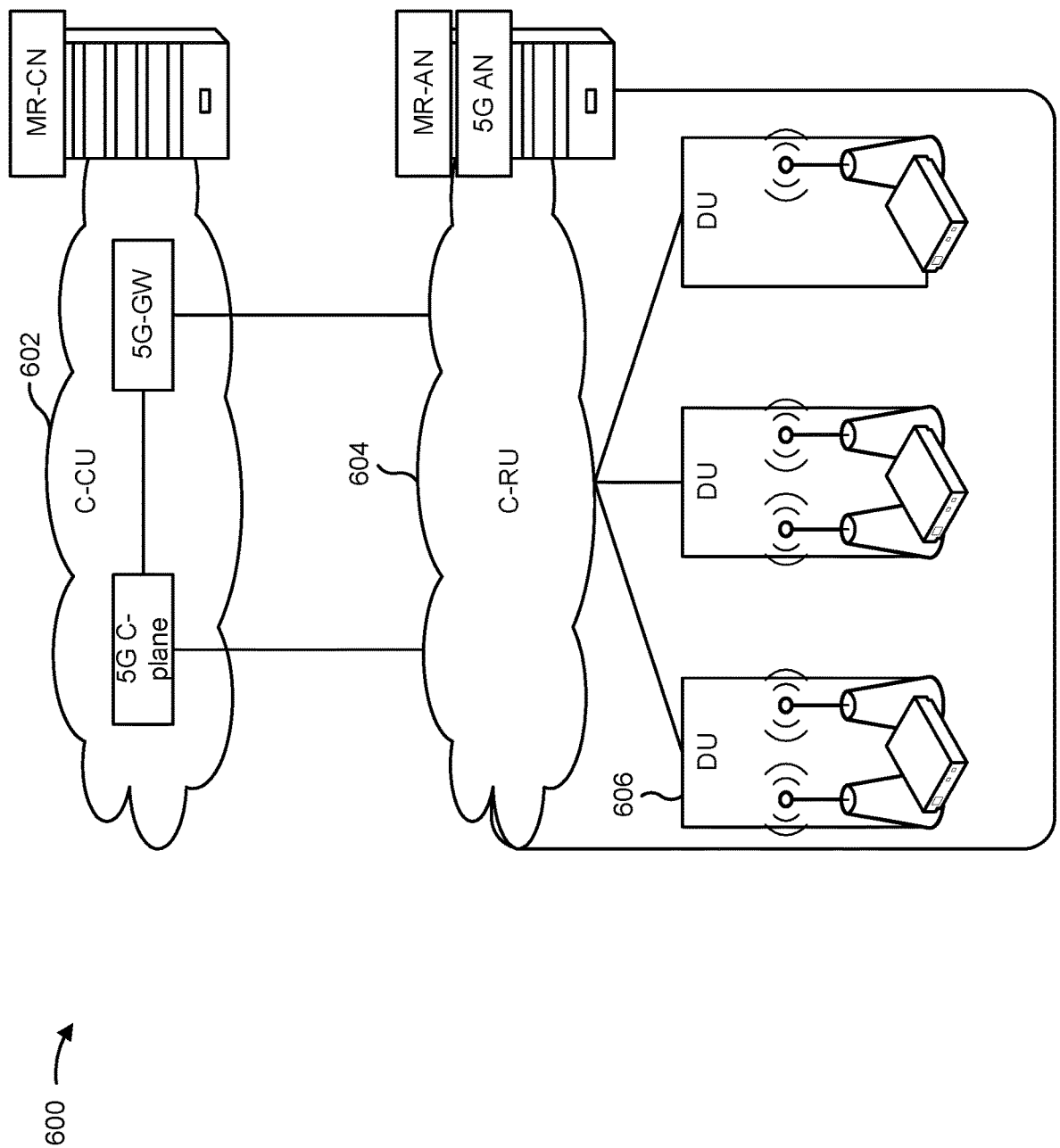
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples may differ from what was described with regard to FIG. 6.

Figure 7:
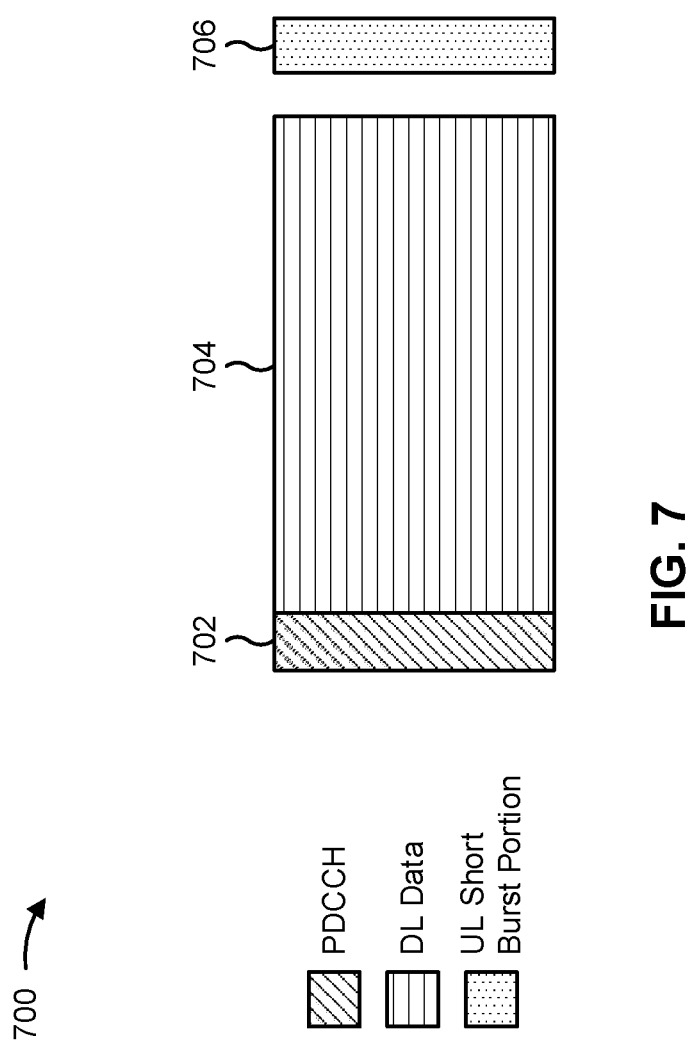
FIG. 7 is a diagram illustrating an example of a downlink (DL)-centric slot, in accordance with various aspects of the present disclosure.

FIG. 7 is a diagram 700 showing an example of a DL-centric slot or wireless communication structure. The DL-centric slot may include a control portion 702. The control portion 702 may exist in the initial or beginning portion of the DL-centric slot. The control portion 702 may include various scheduling information and/or control information corresponding to various portions of the DL-centric slot. In some configurations, the control portion 702 may be a physical DL control channel (PDCCH), as indicated in FIG. 7. In some aspects, the control portion 702 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, and/or the like), and/or the like.

The DL-centric slot may also include a DL data portion 704. The DL data portion 704 may sometimes be referred to as the payload of the DL-centric slot. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric slot may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric slot. For example, the UL short burst portion 706 may include feedback information corresponding to the control portion 702 and/or the data portion 704. Non-limiting examples of information that may be included in the UL short burst portion 706 include an ACK signal (e.g., a physical uplink control channel (PUCCH) ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 7 is provided merely as an example. Other examples may differ from what was described with regard to FIG. 7.

Figure 8:
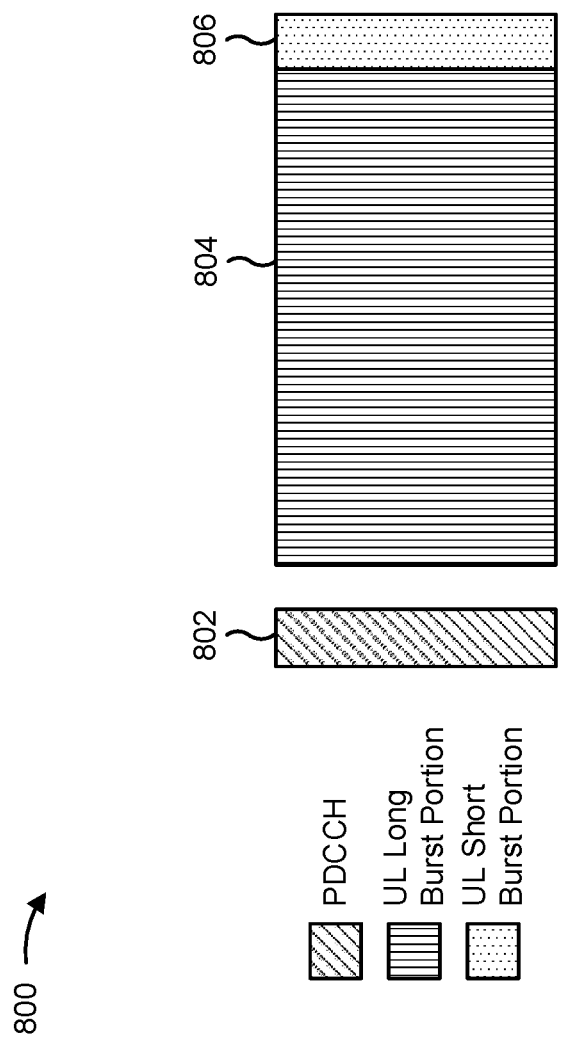
FIG. 8 is a diagram illustrating an example of an uplink (UL)-centric slot, in accordance with various aspects of the present disclosure.

FIG. 8 is a diagram 800 showing an example of an UL-centric slot or wireless communication structure. The UL-centric slot may include a control portion 802. The control portion 802 may exist in the initial or beginning portion of the UL-centric slot. The control portion 802 in FIG. 8 may be similar to the control portion 702 described above with reference to FIG. 7. The UL-centric slot may also include an UL long burst portion 804. The UL long burst portion 804 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 802 may be a physical DL control channel (PDCCH).

As illustrated in FIG. 8, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 806. The UL short burst portion 806 in FIG. 8 may be similar to the UL short burst portion 706 described above with reference to FIG. 7, and may include any of the information described above in connection with FIG. 7. The foregoing is merely one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 8 is provided merely as an example. Other examples may differ from what was described with regard to FIG. 8.

In Long-Term Evolution (LTE) mobility enhancement, a random access channel (RACH)-less procedure handover (HO) can be applied for HO and secondary cell group (SCG) change for dual-connectivity. In LTE, a user equipment (UE) can only perform a RACH-less procedure when a timing advance for a target master base station (BS) (e.g., a target MeNB) is the same as for a source master BS (e.g., a source MeNB), such as in a synchronous network, or when the timing advance is zero, such as in a small cell deployment. In LTE, a target BS optionally provides a pre-allocated uplink (UL) grant (e.g., similar to an uplink semi-persistent scheduling (SPS) without L1 signaling activation) and information identifying a timing advance of the target BS to a source BS, and the source BS provides these to a UE. No additional power offset or control is performed in LTE for an initial physical uplink shared channel (PUSCH) transmission from the UE. If the UE does not receive the pre-allocated UL grant, then the UE monitors a physical downlink control channel (PDCCH) of the target BS for an UL grant. The UE releases the UL grant indicated by radio resource control (RRC) when a T304 timer expires. LTE does not provide a RACH-less procedure for asynchronous networks. However, the usage of a RACH-less procedure may conserve air interface resources and reduce overhead, and may thus be beneficial in an asynchronous network, particularly since asynchronous networks are expected to be common in NR.

Some techniques and apparatuses described herein provide for performing a RACH-less procedure in NR, such as during primary cell (PCell) change when a target BS is a serving secondary cell (SCell) (e.g., in carrier aggregation, the PCell and the SCell are synchronized, and changing an active SCell to a PCell causes no issues for L1 operation), during HO in a dual connectivity scenario during role switching (e.g., when an MgNB is switched to an SgNB and an SgNB is switched to an MgNB), and/or the like. For example, the RACH-less procedure may include use of a pre-allocated UL grant that identifies multiple candidate beams for a UE, may be used in an asynchronous network, may include use of error handling, and/or the like for a UE operating in an NR environment. This reduces or eliminates a need for the UE to perform a RACH procedure in particular scenarios, which conserves network resources (e.g., bandwidth) that would otherwise be consumed performing the RACH procedure in NR. In addition, this conserves time that would otherwise elapse during performance of the RACH procedure in NR. Further, this conserves processing resources of the UE and/or a BS that would otherwise be consumed performing the RACH procedure in NR.

Figure 9:
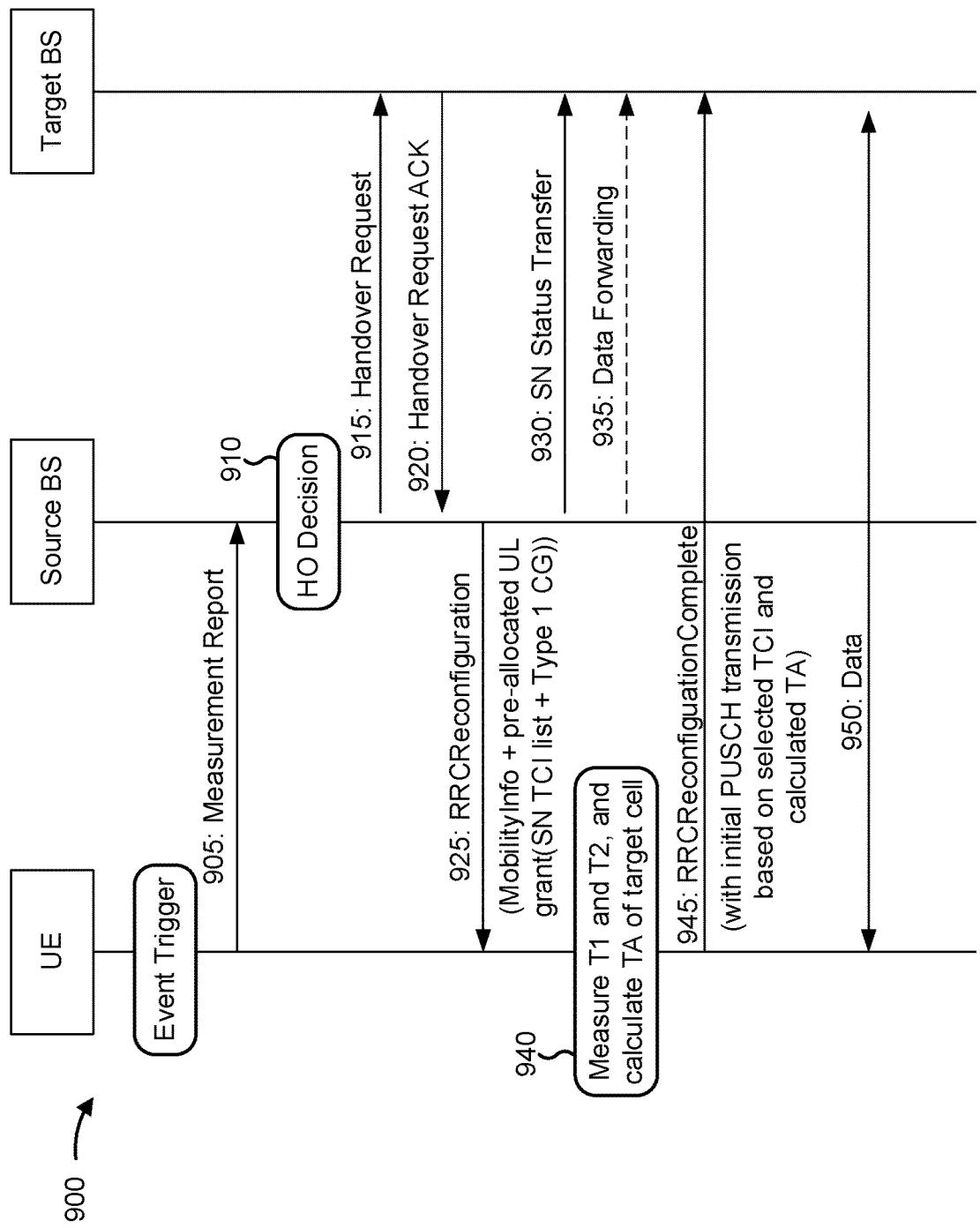
FIGS. 9-12 are diagrams illustrating examples of a random access channel (RACH)-less procedure, in accordance with various aspects of the present disclosure.

FIG. 9 is a diagram illustrating an example 900 of a random access channel (RACH)-less procedure, in accordance with various aspects of the present disclosure.

As shown by reference number 905, a UE (e.g., UE 120) may transmit, to a source BS (e.g., BS 110) (e.g., associated with a source cell), a measurement report based at least in part on an event trigger. As shown by reference number 910, the source BS may make a handover (HO) decision based at least in part on receiving the measurement report from the UE. As shown by reference number 915, the source BS may transmit, to a target BS (e.g., BS 110) (e.g., associated with a target cell), a HO request based at least in part on making the HO decision. As shown by reference number 920, the target BS may transmit, to the source BS, a HO request acknowledgement (ACK).

As shown by reference number 925, the source BS may transmit, to the UE, an RRC reconfiguration message (e.g., an RRCReconfiguration message) based at least in part on receiving the HO request ACK. In some aspects, the RRC reconfiguration message may include mobility information for the UE (e.g., MobilityInfo). Additionally, or alternatively, the RRC reconfiguration message may include a pre-allocated uplink (UL) grant. In some aspects, the pre-allocated UL grant may include a secondary node (SN) transmission configuration indicator (TCI) list and/or a type 1 configured grant (CG). In some aspects, the source BS may transmit the pre-allocated UL grant included in the RRC reconfiguration message in association with an HO command. In some aspects, the source BS may transmit repetitions of the pre-allocated UL grant, which increases the chances of proper reception of the pre-allocated UL grant and improves network operations.

In some aspects, the TCI list may be associated with selecting a beam via which the UE is to transmit an initial physical uplink shared channel (PUSCH) transmission. For example, the UE may select the beam based at least in part on the TCI list and/or information derived from use of the TCI list. In some aspects, the TCI list may include information for multiple candidate beams of a target BS. For example, the RACH-less procedure may fail if the TCI list includes information for a single beam (e.g., due to the single beam being outdated). In some aspects, a source of quasi-collocation (QCL) information associated with the TCI list is based at least in part on a synchronization signal and physical broadcast channel block (SSB), a channel state information reference signal (CSI-RS) associated with a beam spatial direction in which the UE is to send a PUSCH transmission in a target cell, and/or the like.

In some aspects, the pre-allocated UL grant may include information that identifies a grant scheduling interval, information that identifies a quantity of configured hybrid automatic repeat request (HARD) processes to be used, information related to power control for respective reference signals (RSs) quasi-collocated with TCIs included in the TCI list, and/or the like.

In some aspects, the pre-allocated UL grant may include a set of information elements (IEs) that stores configuration information for the pre-allocated UL grant. For example, the pre-allocated UL grant may include a timeDomainOffset IE, a timeDomainAllocation IE, a frequencyDomainAllocation IE, an mcsAndTBS IE, a cg-DMRS-Configuration IE, an nrofHARQ-Processes IE, a periodicity IE, a repK IE, a repK-RV IE, a rach-less-timer IE, a tci-States-ToAddList IE, a tci-State-ToReleaseList IE, a rsrp-ThresholdSSB IE, a pathlossReferenceIndex IE, and/or the like.

In some aspects, a periodicity of the pre-allocated UL grant is in a unit of symbols. For example, for a symbol that includes 15 Kilohertz (KHz) subcarriers the periodicity may be 0.1429 milliseconds (ms), for a symbol that includes 30 KHz subcarriers the periodicity may be 0.0714 ms, for a symbol that includes 60 KHz the periodicity may be 0.0357 ms, for a symbol that includes 102 KHz subcarriers, the periodicity may be 0.0179 ms, and so forth.

As shown by reference number 930, the source BS may transmit, to the target BS, an SN status transfer. In some aspects, the source BS may transmit the SN status transfer to the target BS based at least in part on, or after, transmitting the RRC reconfiguration message (e.g., that includes the pre-allocation UL grant) to the UE. As shown by reference number 935, the source BS may perform data forwarding to the target BS. For example, the source BS may perform data forwarding to the target BS based at least in part on, or after, transmitting the SN status transfer to the target BS.

As shown by reference number 940, the UE may measure a first propagation delay (T1) associated with the source BS and a second propagation delay (T2) associated with the target BS based at least in part on receiving the pre-allocated UL grant from the source BS. In some aspects, the UE may measure the first propagation delay and the second propagation delay in association with the source BS transmitting the SN status transfer and/or performing the data forwarding. In some aspects, the UE may calculate a timing advance (TA) of the target BS based at least in part on measuring the first propagation delay and the second propagation delay.

In some aspects, the UE may select a TCI from the TCI list. For example, the UE may select a TCI from the TCI list based at least in part on, or in association with, measuring the first propagation delay and the second propagation delay, calculating the timing advance, and/or the like. In some aspects, the UE may select the TCI based at least in part on respective QCLs (e.g., respective QCL parameters, respective QCL configurations, respective QCL relationships, and/or the like) for TCIs included in the TCI list. For example, the UE may select a TCI with a highest QCL relative to other TCIs, a TCI with a QCL that satisfies a threshold (e.g., a threshold reused from a RACH procedure, or a new threshold), and/or the like. In some aspects, when multiple QCLs for a set of TCIs of the TCI list satisfy a threshold, the UE may select a single TCI from the set of TCIs.

As shown by reference number 945, the UE may transmit, to the target BS, an RRC reconfiguration complete message (e.g., an RRCReconfigurationComplete message). For example, the UE may transmit the RRC reconfiguration complete message based at least in part on selecting the TCI, measuring the first propagation delay and the second propagation delay, calculating the timing advance, and/or the like. In some aspects, the UE may transmit an initial PUSCH transmission to the target cell. For example, the initial PUSCH transmission may be based at least in part on a selected TCI from the TCI list. In some aspects, the initial PUSCH transmission may be further based at least in part on the timing advance that the UE calculated. As shown by reference number 950, the UE and the target BS may exchange data. For example, the UE and the target BS may exchange data based at least in part on the UE transmitting the initial PUSCH transmission to the target BS.

In some aspects, the UE and/or the source BS may release the pre-allocated UL grant. For example, the UE and/or the source BS may release the pre-allocated UL grant based at least in part on failure of a random access channel (RACH)-less procedure (e.g., based at least in part on expiration of a RACH-less timer, a timing difference between the source BS and the target BS that satisfies a threshold, and/or the like), failure of a handover procedure (e.g., based at least in part on expiration of a T304 timer), explicit release by the source BS or another BS (e.g., upon successful reception of the initial PUSCH transmission by the target BS), and/or the like.

In some aspects, the UE and/or the source BS may perform error handling in association with a RACH-less procedure described in connection with FIG. 9 and/or elsewhere herein. For example, the UE and/or the source BS may perform the error handling based at least in part on detecting failure of a RACH-less procedure. In some aspects, the UE and/or the source BS may detect a failure of a RACH-less procedure based at least in part on expiration of a timer associated with the RACH-less procedure (e.g., configured to multiple periodicities, such as to reduce a chance of configuring the timer with a higher value than a T304 timer, such that the timer has a value that is less than a T304 timer, and/or the like), a timing difference between a source cell associated with the source BS and a target cell associated with the target BS satisfying a threshold, and/or the like.

In some aspects, the UE and/or the source BS may initiate the timer associated with the RACH-less procedure based at least in part on a handover command from the source BS to the UE, an RRC reconfiguration message for SCG configuration from the source BS to the UE, the pre-allocated UL grant from the source BS to the UE, and/or the like. In some aspects, the UE and/or the source BS may stop the timer based at least in part on an ACK for the initial PUSCH transmission, expiration of a T304 timer (e.g., due to a poor network configuration), and/or the like. In some aspects, if failure of the RACH-less procedure is due to a poor network configuration, then the UE and the source BS may perform RRC reestablishment (e.g., rather than contention based random access (CBRA)). In some aspects, if the timer associated with the RACH-less procedure expires, or the RACH-less procedure otherwise fails, then the UE and/or the source BS may perform CBRA with respect to the target BS.

As indicated above, FIG. 9 is provided as an example. Other examples may differ from what was described with respect to FIG. 9.

Figure 10:
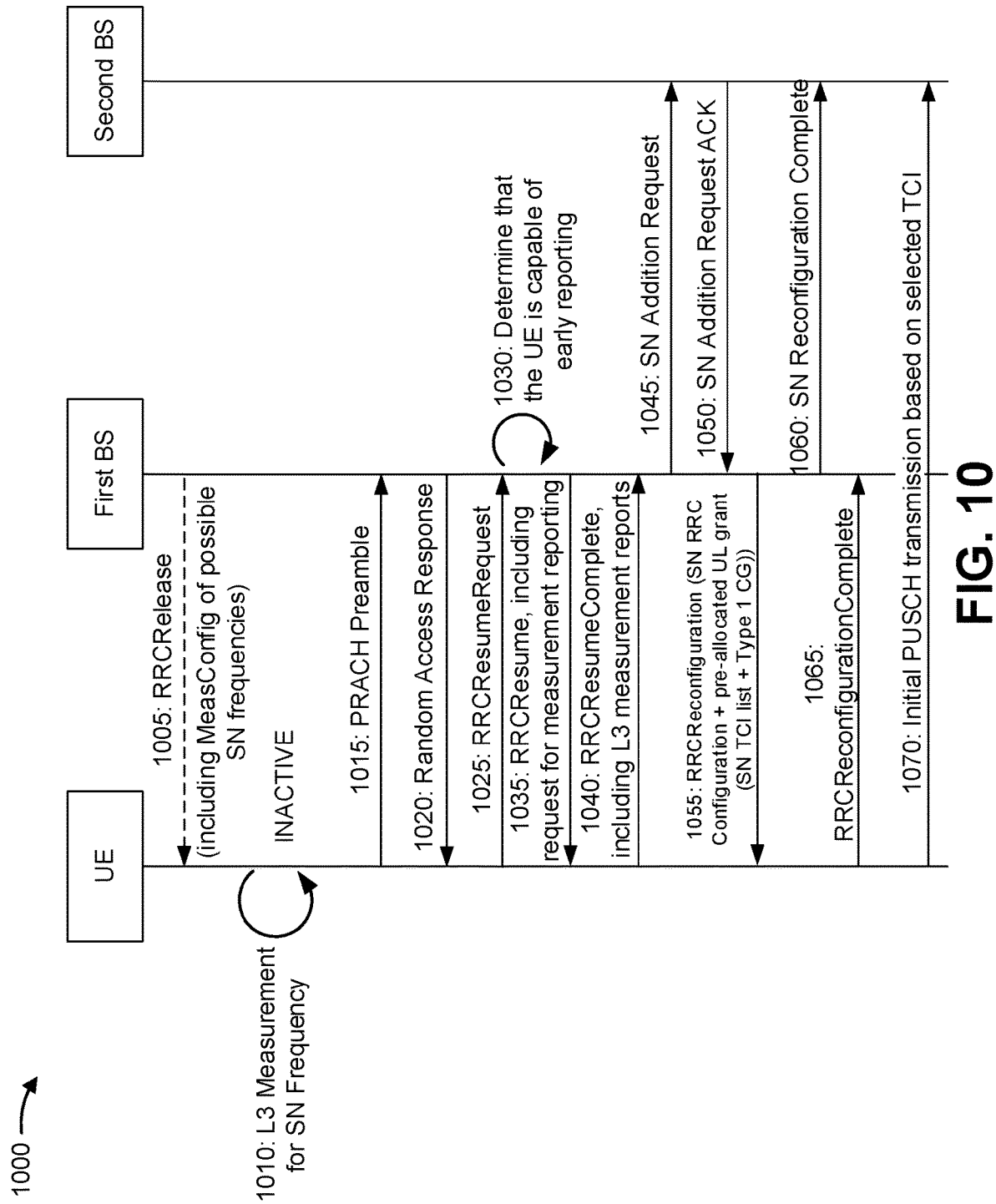

FIG. 10 is a diagram illustrating an example 1000 of a random access channel (RACH)-less procedure, in accordance with various aspects of the present disclosure. FIG. 10 shows an example of a RACH-less procedure used in connection with an SN addition procedure upon master node (MN) RRC resume.

As shown by reference number 1005, a first BS (e.g., a last serving MN) may transmit, to a UE, an RRC release message (e.g., an RRCRelease message). For example, the first BS may transmit an RRC release message that includes a measurement configuration (e.g., measConfig) for possible SN frequencies. As shown by reference number 1010, the UE may perform an L3 measurement for SN frequency. For example, the UE may perform the L3 measurement while in an inactive state. As shown by reference number 1015, the UE may transmit, to the first BS, a physical random access channel (PRACH) preamble. For example, the UE may transmit the PRACH preamble based at least in part on performing the L3 measurement.

As shown by reference number 1020, the first BS may transmit, to the UE, a random access response. For example, the first BS may transmit the random access response to the UE based at least in part on receiving the PRACH preamble. As shown by reference number 1025, the UE may transmit, to the first BS, an RRC resume request (e.g., an RRCResumeRequest). For example, the UE may transmit the RRC resume request based at least in part on receiving the random access response. In some aspects, the RRC resume request may include a resume identifier that identifies the UE and the RRC resume request. As shown by reference number 1030, the first BS may determine that the UE is capable of early reporting based at least in part on the resume identifier.

As shown by reference number 1035, the first BS may transmit, to the UE, an RRC resume message (e.g., an RRCResume message). For example, the first BS may transmit the RRC resume message based at least in part on determining that the UE is capable of early reporting. In some aspects, the RRC resume message may include a request for measurement reporting. As shown by reference number 1040, the UE may transmit, to the first BS, an RRC resume complete message (e.g., an RRCResumeComplete message). For example, the UE may transmit the RRC resume complete message based at least in part on receiving the RRC resume message. In some aspects, the RRC resume complete message may include a set of L3 measurement reports related to a set of L3 measurements that the UE performed.

As shown by reference number 1045, the first BS may transmit, to a second BS (e.g., an SN), an SN addition request. For example, the first BS may transmit the SN addition request based at least in part on receiving the RRC resume complete message. As shown by reference number 1050, the second BS may transmit, to the first BS, an SN addition request ACK. For example, the second BS may transmit the SN addition request ACK based at least in part on receiving the SN addition request.

As shown by reference number 1055, the first BS may transmit an RRC reconfiguration message to the UE (e.g., an RRCReconfiguration message). For example, the first BS may transmit the RRC reconfiguration message based at least in part on receiving the SN addition request ACK. In some aspects, the RRC reconfiguration message may include an SN RRC configuration. Additionally, or alternatively, the RRC reconfiguration message may include a pre-allocated UL grant similar to that described elsewhere herein (e.g., that includes an SN TCI list and type 1 CG).

As shown by reference number 1060, the first BS may transmit, to the second BS, an SN reconfiguration complete message. For example, the first BS may transmit the SN reconfiguration complete message to the second BS based at least in part on, or in association with, transmitting the RRC reconfiguration message to the UE. In some aspects, the SN reconfiguration complete message may be associated with the SN addition request ACK.

As shown by reference number 1065, the UE may transmit, to the first BS, an RRC reconfiguration complete message (e.g., an RRCReconfigurationComplete message). For example, the UE may transmit the RRC reconfiguration complete message based at least in part on receiving the RRC reconfiguration message, in association with the first BS transmitting the SN reconfiguration complete message, and/or the like. A shown by reference number 1070, the UE may transmit, to the second BS, an initial PUSCH transmission. For example, the UE may transmit the initial PUSCH transmission based at least in part on receiving the RRC reconfiguration message, based at least in part on transmitting the RRC reconfiguration complete message, and/or the like. In some aspects, the initial PUSCH transmission may be based on a TCI selected from the TCI list. For example, the UE may select the TCI in a manner that is the same as or similar to that described elsewhere herein, and may transmit the initial PUSCH transmission based at least in part on selecting the TCI.

As indicated above, FIG. 10 is provided as an example. Other examples may differ from what was described with respect to FIG. 10.

Figure 11:
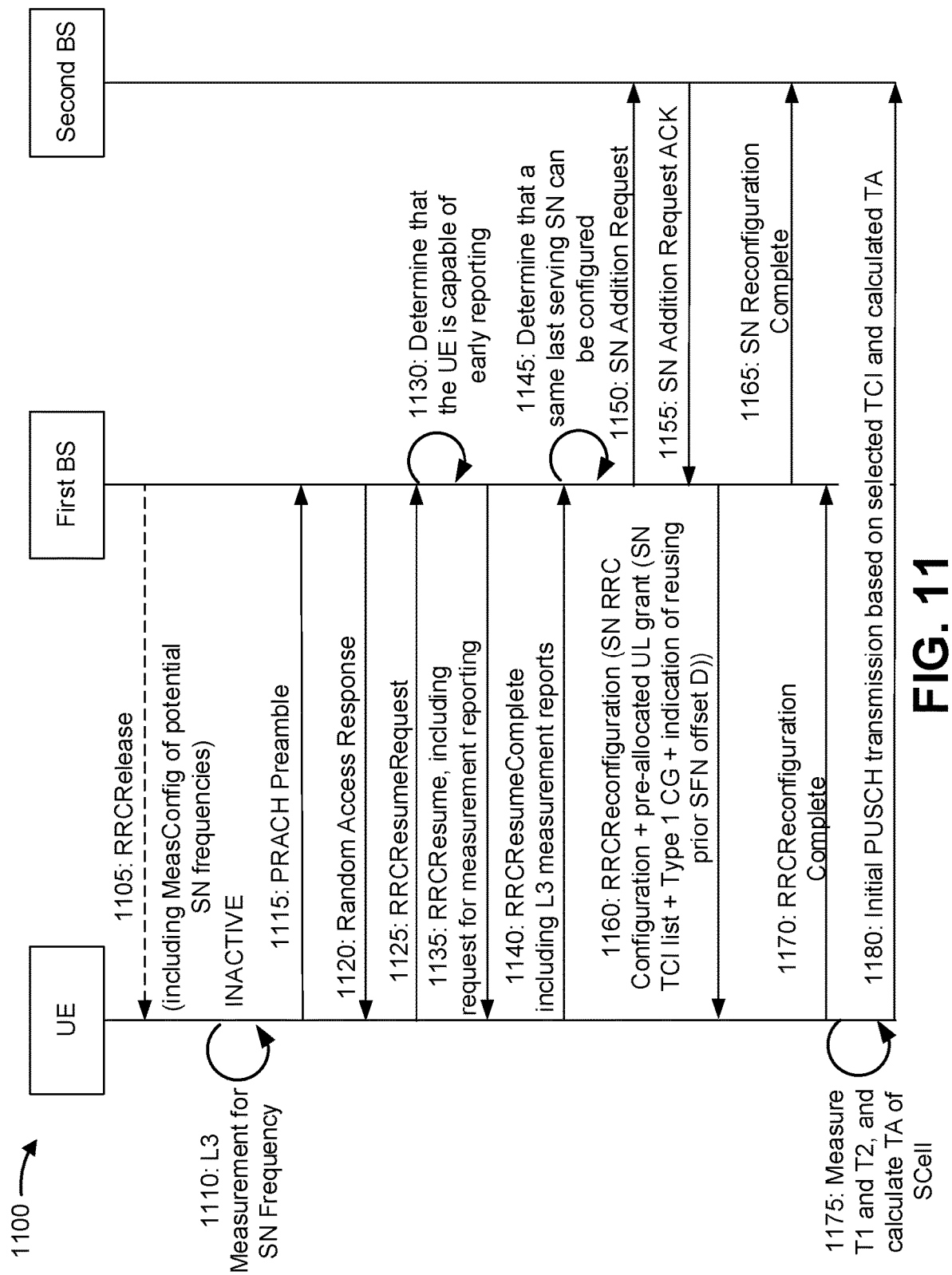

FIG. 11 is a diagram illustrating an example 1100 of a random access channel (RACH)-less procedure, in accordance with various aspects of the present disclosure. FIG. 11 shows an example of a RACH-less procedure used in connection with an asynchronous network in NR dual connectivity.

As shown by reference numbers 1105-1140, a UE, a first BS (e.g., a last serving MN), and a second BS (e.g., an SN) may perform actions similar to that described in connection with FIG. 10. In some aspects, and as shown by reference number 1135, the first BS may transmit an RRC resume message (e.g., an RRCResume message) to the UE prior to transmitting a pre-allocated UL grant. In some aspects, the RRC resume message may be associated with causing the UE to determine a system frame number (SFN) offset between an MN associated with the first BS and an SN associated with the second BS. In some aspects, a timing advance of the SN may be represented by the following equation:

$$TA_{SgNB} = TA_{MgNB} - (T1 - T2) - D$$

where $TA_{SgNB}$ is a timing advance for the second BS (e.g., an SN, an SgNB, and/or the like), $TA_{MgNB}$ is a timing advance for the first BS (e.g., an MN, an MgNB, a last serving MN, and/or the like), T1 is a first propagation delay for the first BS, T2 is a second propagation delay for the second BS, and D is an SFN offset between the MN and the SN. In other words, a timing advance of the SN may be equal to a timing advance of the MN minus a difference, between a first propagation delay of the MN and a second propagation delay of the SN, minus the SFN offset. In some aspects, the first propagation delay and the second propagation delay may be associated with a master information block (MIB). For example, the UE may determine the first propagation delay and the second propagation delay via MIB acquisition after reception of an RRC reconfiguration message (e.g., an RRCReconfiguration message). In some aspects, the UE may store the SFN offset prior to entering an inactive mode and/or after determining the SFN offset.

As shown by reference number 1145, the first BS may determine that a same last serving SN can be configured for the UE. For example, the first BS may determine that a same last serving SN can be configured for the UE after transmitting an RRC resume message to the UE, based at least in part on receiving an RRC resume complete message from the UE, and/or the like. As shown by reference numbers 1150-1170, the UE, the first BS, and the second BS may perform actions similar to that described in connection with FIG. 10. For example, and as shown by reference number 1160, the first BS may transmit, to the UE, a pre-allocated UL grant that includes an SN TCI list and a type 1 CG. In some aspects, the pre-allocated UL grant may further include an indication to re-use a prior system frame number (SFN) offset as an SFN offset.

As shown by reference number 1175, the UE may measure a first propagation delay (e.g., T1) associated with the first BS and a second propagation delay (e.g., T2) associated with the second BS based at least in part on receiving the pre-allocated UL grant from the first BS, in a manner similar to that described elsewhere herein. In some aspects, and as further shown by reference number 1175, the UE may calculate a timing advance for an SCell associated with the second BS based at least in part on the first propagation delay and the second propagation delay, in a manner similar to that described elsewhere herein. As shown by reference number 1180, the UE may transmit, to the second BS, an initial PUSCH transmission in a manner similar to that described elsewhere herein. For example, the UE may transmit the initial PUSCH transmission based at least in part on a selected TCI and a calculated timing advance. Continuing with the previous example, the UE may select a TCI from the TCI list and may calculate a timing advance from a first propagation delay and a second propagation delay, in a manner similar to that described elsewhere herein, and may transmit the initial PUSCH transmission based at least in part on selecting the TCI and calculating the timing advance.

As indicated above, FIG. 11 is provided as an example. Other examples may differ from what was described with respect to FIG. 11.

Figure 12:
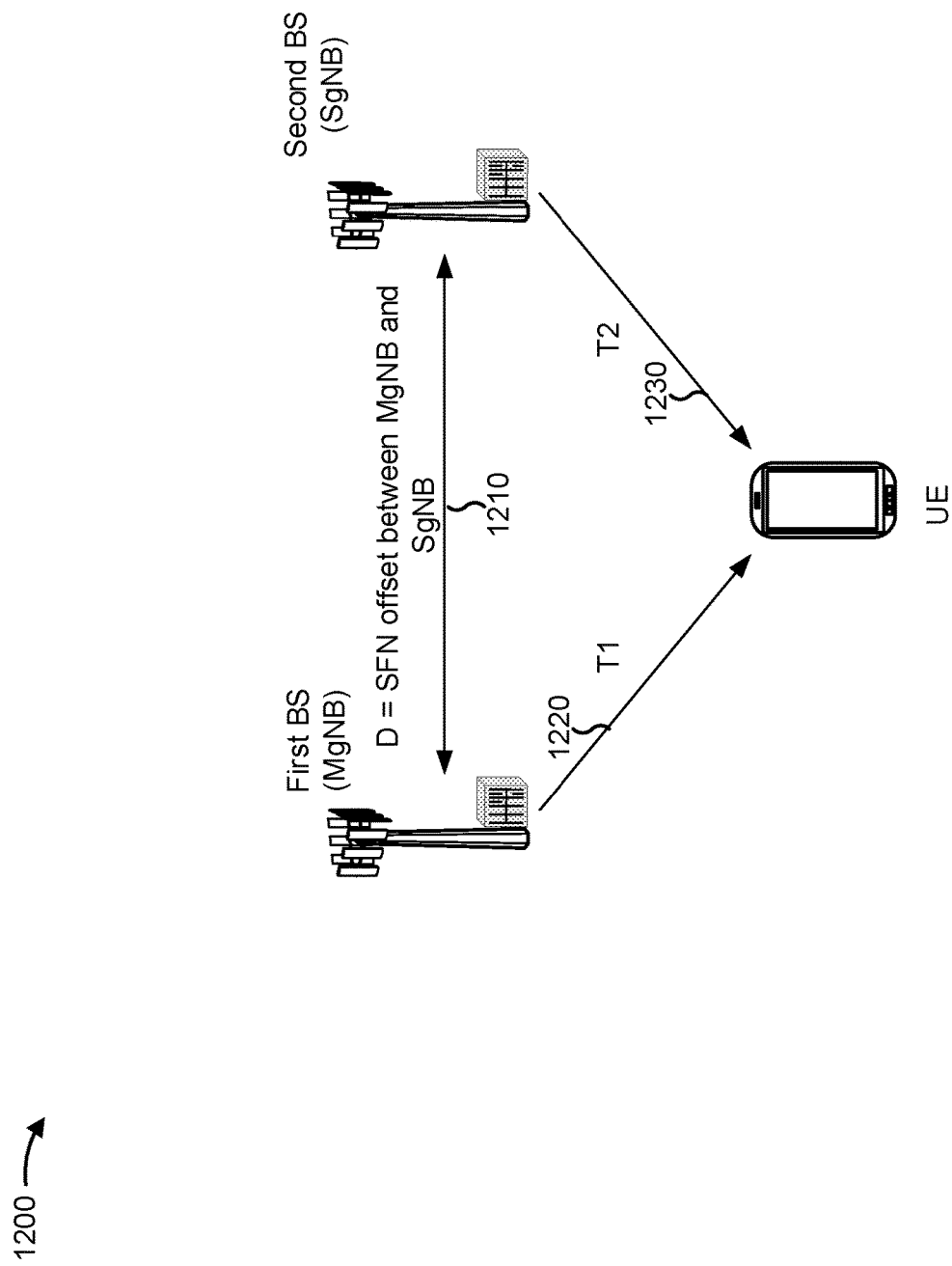

FIG. 12 is a diagram illustrating an example 1200 of random access channel (RACH)-less procedure, in accordance with various aspects of the present disclosure. FIG. 12 shows an example of a RACH-less procedure used in connection with an asynchronous network in NR dual connectivity. As shown, example 1200 includes a first BS (e.g., an MgNB), a second BS (e.g., an SgNB), and a UE.

As shown by reference number 1210, the first BS and the second BS may exchange D, an SFN offset between the first BS and the second BS (e.g., between the MgNB and the SgNB). As shown by reference number 1220, the first BS may provide information that identifies a first propagation delay of the first BS to the UE. As shown by reference number 1230, the second BS may provide information that identifies a second propagation delay of the second BS to the UE. In some aspects, the UE may measure the first propagation delay and the second propagation delay and may calculate a timing advance of the second BS, in a manner similar to that described elsewhere herein. In some aspects, the UE may transmit an initial PUSCH transmission to the second BS, in a manner similar to that described elsewhere herein.

As indicated above, FIG. 12 is provided as an example. Other examples may differ from what was described with respect to FIG. 12.

Figure 13:
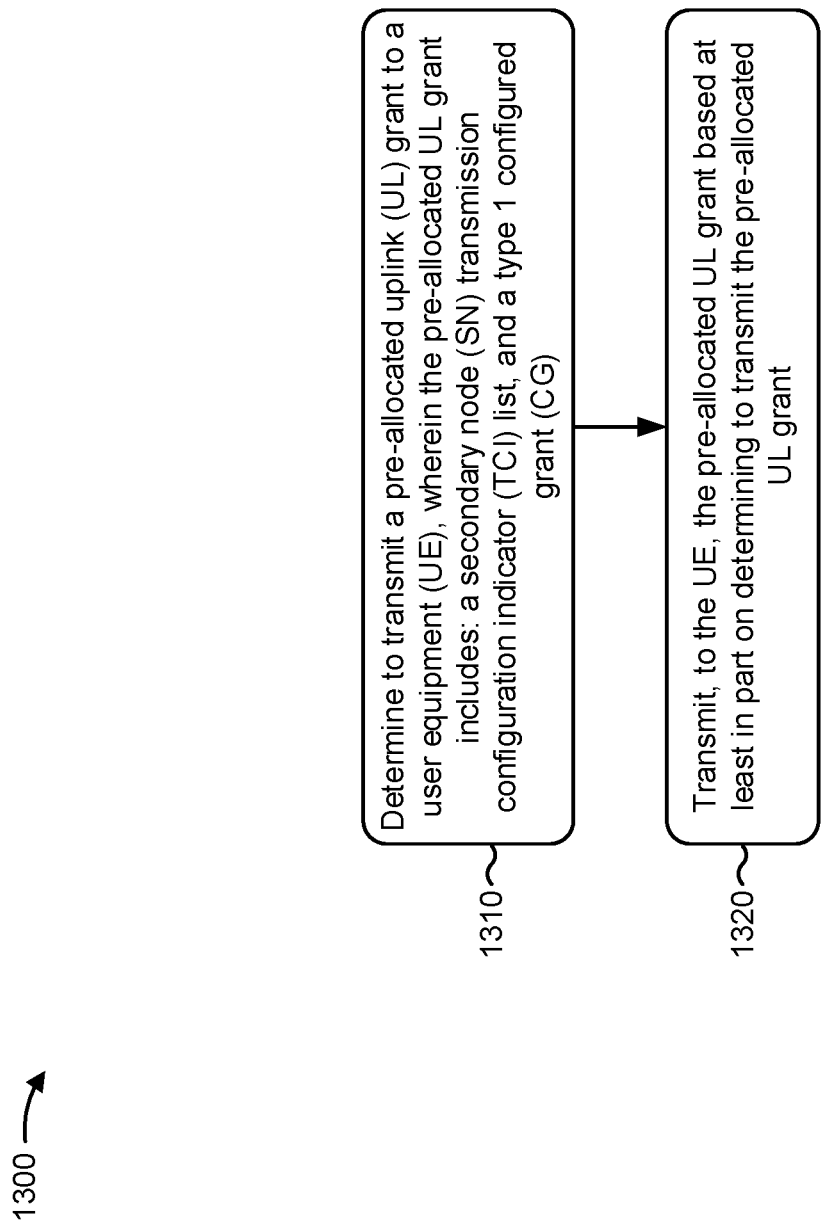
FIG. 13 is a diagram illustrating an example process performed, for example, by a base station, in accordance with various aspects of the present disclosure.

FIG. 13 is a diagram illustrating an example process 1300 performed, for example, by a BS, in accordance with various aspects of the present disclosure. Example process 1300 is an example where a BS (e.g., BS 110) performs a random access channel (RACH)-less procedure.

As shown in FIG. 13, in some aspects, process 1300 may include determining to transmit a pre-allocated uplink (UL) grant to a user equipment (UE), wherein the pre-allocated UL grant includes: a secondary node (SN) transmission configuration indicator (TCI) list, and a type 1 configured grant (CG) (block 1310). For example, the BS (e.g., using controller/processor 240 and/or the like) may determine to transmit a pre-allocated uplink (UL) grant to a user equipment (UE), as described elsewhere herein. In some aspects, the pre-allocated UL grant includes: a secondary node (SN) transmission configuration indicator (TCI) list, and a type 1 configured grant.

As further shown in FIG. 13, in some aspects, process 1300 may include transmitting, to the UE, the pre-allocated UL grant based at least in part on determining to transmit the pre-allocated UL grant (block 1320). For example, the BS (e.g., using controller/processor 240, transmit processor 220, TX MIMO processor 230, MOD 232, antenna 234, and/or the like) may transmit, to the UE, the pre-allocated UL grant based at least in part on determining to transmit the pre-allocated UL grant, as described elsewhere herein.

Process 1300 may include additional aspects, such as any single aspect and/or any combination of aspects described below and/or in connection with one or more other processes described elsewhere herein.

In a first aspect, the TCI list includes information for multiple candidate beams of a target cell, and the pre-allocated UL grant is included in a radio resource control (RRC) reconfiguration message. In a second aspect, alone or in combination with the first aspect, the BS may transmit repetitions of the pre-allocated UL grant based at least in part on determining to transmit the pre-allocated UL grant.

In a third aspect, alone or in combination with one or more of the first aspect and the second aspect, the BS may determine to transmit the pre-allocated UL grant in association with at least one of: a handover of the UE, an addition of a secondary node (SN), or a change in the SN. In a fourth aspect, alone or in combination with one or more of the first through third aspects, the BS may transmit the pre-allocated UL grant in association with a handover command, wherein the TCI list is associated with selecting a beam via which the UE is to transmit an initial physical uplink shared channel (PUSCH) transmission.

In a fifth aspect, alone or in combination with one or more of the first through fourth aspects, a source of quasi-collocation (QCL) information associated with the TCI list is based at least in part on at least one of: a synchronization signal and physical broadcast channel block (SSB), or a channel state information reference signal (CSI-RS) associated with a beam spatial direction in which the UE is to send a physical uplink shared channel (PUSCH) transmission in a target cell. In a sixth aspect, alone or in combination with one or more of the first through fifth aspects, the pre-allocated UL grant includes at least one of: information that identifies a grant scheduling interval, information that identifies a quantity of configured hybrid automatic repeat request (HARQ) processes to be used, or information related to power control for respective reference signals (RSs) quasi-collocated with TCIs included in the TCI list.

In a seventh aspect, alone or in combination with one or more of the first through sixth aspects, the BS may determine to transmit the pre-allocated UL grant based at least in part on receiving a handover request acknowledgement (ACK). In an eighth aspect, alone or in combination with one or more of the first through seventh aspects, the BS may determine to transmit the pre-allocated UL grant based at least in part on receiving a secondary node (SN) addition request acknowledgement (ACK), wherein the BS is a last serving master node (MN). In a ninth aspect, alone or in combination with one or more of the first through eighth aspects, the BS may transmit, to an SN, an SN reconfiguration complete message based at least in part on transmitting the pre-allocated UL grant, wherein the SN reconfiguration complete message is associated with the SN addition request ACK.

In a tenth aspect, alone or in combination with one or more of the first through ninth aspects, the BS may receive, from the UE, a radio resource control (RRC) reconfiguration complete message based at least in part on transmitting the pre-allocated UL grant. In an eleventh aspect, alone or in combination with one or more of the first through tenth aspects, the pre-allocated UL grant includes a set of information elements (IEs) that stores configuration information for the pre-allocated UL grant.

In a twelfth aspect, alone or in combination with one or more of the first through eleventh aspects, a periodicity of the pre-allocated UL grant is in a unit of symbols. In a thirteenth aspect, alone or in combination with one or more of the first through twelfth aspects, the pre-allocated UL grant is released based at least in part on at least one of: failure of a random access channel (RACH)-less procedure, failure of a handover procedure, or explicit release by the BS or another BS.

In a fourteenth aspect, alone or in combination with one or more of the first through thirteenth aspects, the BS may detect a failure of a random access channel (RACH)-less procedure based at least in part on at least one of: expiration of a timer associated with the RACH-less procedure, or a timing difference, between a source cell associated with the BS and a target cell associated with another BS, that satisfies a threshold. In a fifteenth aspect, alone or in combination with one or more of the first through fourteenth aspects, the timer is configured to multiple periodicities.

In a sixteenth aspect, alone or in combination with one or more of the first through fifteenth aspects, the timer is initiated based at least in part on at least one of: transmitting a handover command to the UE, or transmitting the pre-allocated UL grant to the UE. In a seventeenth aspect, alone or in combination with one or more of the first through sixteenth aspects, the timer is stopped based at least in part on at least one of: an acknowledgement for an initial physical uplink shared channel (PUSCH) transmission, or expiration of a T304 timer.

In an eighteenth aspect, alone or in combination with one or more of the first through seventeenth aspects, the timer has a value that is less than a T304 timer. In a nineteenth aspect, alone or in combination with one or more of the first through eighteenth aspects, expiration of the timer is associated with performance of contention based random access (CBRA). In a twentieth aspect, alone or in combination with one or more of the first through nineteenth aspects, the BS may transmit a radio resource control (RRC) resume message to the UE prior to determining to transmit the pre-allocated UL grant, wherein the RRC resume message is associated with causing the UE to determine a system frame number (SFN) offset between a master node (MN), associated with the BS, and a secondary node (SN) associated with another BS.

In a twenty-first aspect, alone or in combination with one or more of the first through twentieth aspects, a timing advance of the SN is equal to a timing advance of the MN minus a difference, between a first propagation delay of the MN and a second propagation delay of the SN, minus the SFN offset. In a twenty-second aspect, alone or in combination with one or more of the first through twenty-first aspects, the first propagation delay and the second propagation delay are associated with a master information block (MIB).

In a twenty-third aspect, alone or in combination with one or more of the first through twenty-second aspects, the BS may store the SFN offset prior to the UE entering an inactive mode. In a twenty-fourth aspect, alone or in combination with one or more of the first through twenty-third aspects, the BS may determine that a same last serving secondary node (SN) can be configured for the UE after transmitting the RRC resume message and prior to determining to transmit the pre-allocated UL grant; and may receive a secondary node (SN) addition request acknowledgement (ACK) from the same last serving SN after determining that the same last serving SN can be configured for the UE. In a twenty-fifth aspect, alone or in combination with one or more of the first through twenty-fourth aspects, the BS may transmit the pre-allocated UL grant based at least in part on receiving the SN addition request ACK, wherein the pre-allocated UL grant further includes an indication to re-use a prior SFN offset as the SFN offset.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
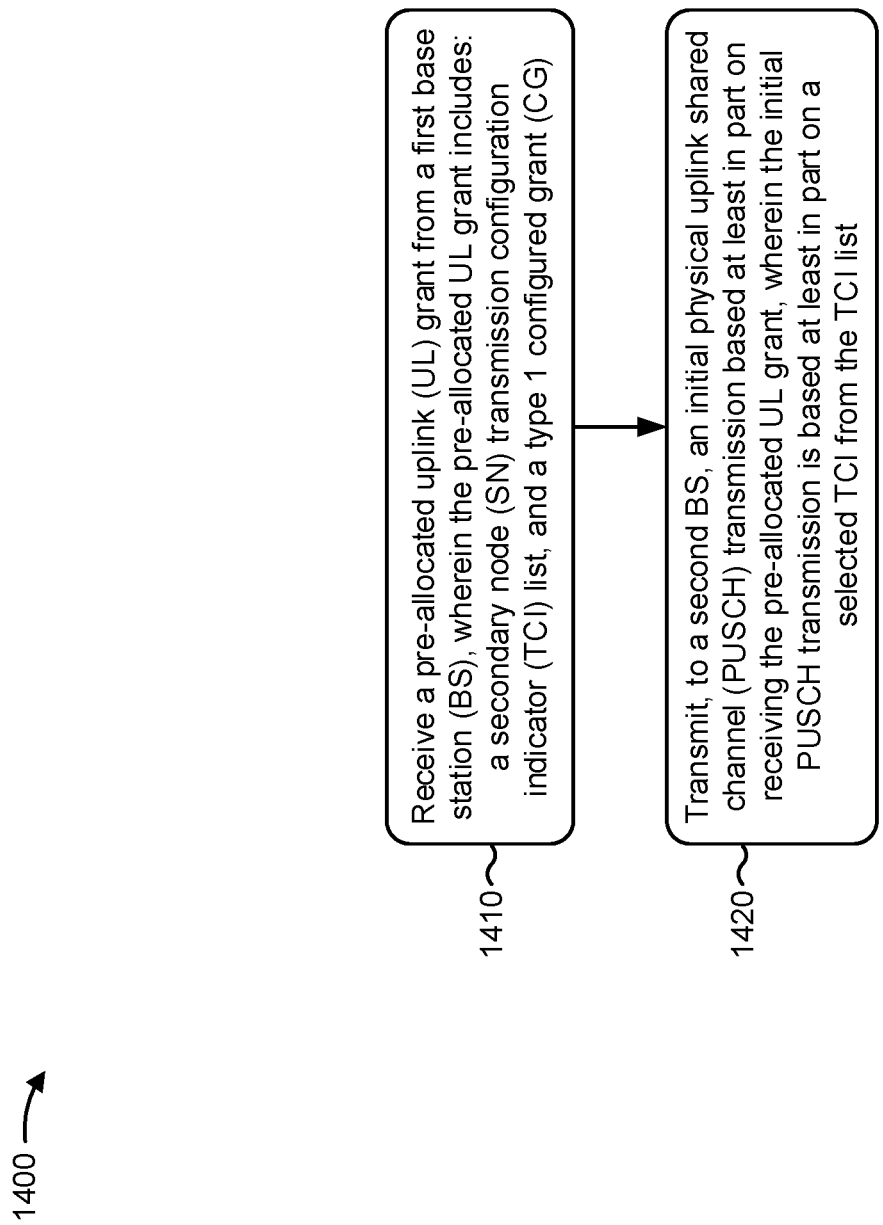
FIG. 14 is a diagram illustrating an example process performed, for example, by a user equipment, in accordance with various aspects of the present disclosure.

FIG. 14 is a diagram illustrating an example process 1400 performed, for example, by a UE, in accordance with various aspects of the present disclosure. Example process 1400 is an example where a UE (e.g., UE 120) performs a random access channel (RACH)-less procedure.

As shown in FIG. 14, in some aspects, process 1400 may include receiving a pre-allocated uplink (UL) grant from a first base station (BS), wherein the pre-allocated UL grant includes: a secondary node (SN) transmission configuration indicator (TCI) list, and a type 1 configured grant (CG) (block 1410). For example, the UE (e.g., using antenna 252, DEMOD 254, MIMO detector 256, receive processor 258, controller/processor 280, and/or the like) may receive a pre-allocated uplink (UL) grant from a first base station (BS), as described elsewhere herein. In some aspects, the pre-allocated UL grant includes: a secondary node (SN) transmission configuration indicator (TCI) list, and a type 1 configured grant (CG).

As further shown in FIG. 14, in some aspects, process 1400 may include transmitting, to a second BS, an initial physical uplink shared channel (PUSCH) transmission based at least in part on receiving the pre-allocated UL grant, wherein the initial PUSCH transmission is based at least in part on a selected TCI from the TCI list (block 1420). For example, the UE (e.g., using controller/processor 280, transmit processor 264, TX MIMO processor 266, MOD 254, antenna 252, and/or the like) may transmit, to a second BS, an initial physical uplink shared channel (PUSCH) transmission based at least in part on receiving the pre-allocated UL grant, as described elsewhere herein. In some aspects, the initial PUSCH transmission is based at least in part on a selected TCI from the TCI list.

Process 1400 may include additional aspects, such as any single aspect and/or any combination of aspects described below and/or in connection with one or more other processes described elsewhere herein.

In a first aspect, the TCI list includes information for multiple candidate beams of a target cell, and the pre-allocated UL grant is included in a radio resource control (RRC) reconfiguration message. In a second aspect, alone or in combination with the first aspect, the UE may receive repetitions of the pre-allocated UL grant.

In a third aspect, alone or in combination with one or more of the first through second aspects, the UE may receive the pre-allocated UL grant in association with at least one of: a handover of the UE, an addition of a secondary node (SN) associated with the second BS, or a change in the SN associated with the second BS. In a fourth aspect, alone or in combination with one or more of the first through third aspects, the UE may receive the pre-allocated UL grant in association with a handover command, wherein the TCI list is associated with selecting a beam via which the UE is to transmit the initial PUSCH transmission.

In a fifth aspect, alone or in combination with one or more of the first through fourth aspects, a source of quasi-collocation (QCL) information associated with the TCI list is based at least in part on at least one of: a synchronization signal and physical broadcast channel block (SSB), or a channel state information reference signal (CSI-RS) associated with a beam spatial direction in which the UE is to send the initial PUSCH transmission in a target cell associated with the first BS. In a sixth aspect, alone or in combination with one or more of the first through fifth aspects, the UE may select the TCI from the TCI list based at least in part on receiving the pre-allocated UL grant.

In a seventh aspect, alone or in combination with one or more of the first through sixth aspects, the UE may select the TCI from a set of TCIs of the TCI list, wherein respective QCLs for the set of TCIs satisfy a threshold. In an eighth aspect, alone or in combination with one or more of the first through seventh aspects, the pre-allocated UL grant includes at least one of: information that identifies a grant scheduling interval, information that identifies a quantity of configured hybrid automatic repeat request (HARQ) processes to be used, or information related to power control for respective reference signals (RSs) quasi-collocated with TCIs included in the TCI list.

In a ninth aspect, alone or in combination with one or more of the first through eighth aspects, the UE may measure a first propagation delay associated with the first BS and a second propagation delay associated with the second BS based at least in part on receiving the pre-allocated UL grant, and may calculate a timing advance of a target cell based at least in part on measuring the first propagation delay and the second propagation delay.

In a tenth aspect, alone or in combination with one or more of the first through ninth aspects, the initial PUSCH transmission is further based at least in part on the timing advance. In an eleventh aspect, alone or in combination with one or more of the first through tenth aspects, the UE may transmit, to the first BS, a radio resource control (RRC) reconfiguration complete message based at least in part on receiving the pre-allocated UL grant and prior to transmitting the initial PUSCH transmission. In a twelfth aspect, alone or in combination with one or more of the first through eleventh aspects, the pre-allocated UL grant includes a set of information elements (IEs) that stores configuration information for the pre-allocated UL grant.

In a thirteenth aspect, alone or in combination with one or more of the first through twelfth aspects, a periodicity of the pre-allocated UL grant is in a unit of symbols. In a fourteenth aspect, alone or in combination with one or more of the first through thirteenth aspects, the pre-allocated UL grant is released based at least in part on at least one of: failure of a random access channel (RACH)-less procedure, failure of a handover procedure, or explicit release by the first BS or the second BS.

In a fifteenth aspect, alone or in combination with one or more of the first through fourteenth aspects, the UE may detect a failure of a random access channel (RACH)-less procedure based at least in part on at least one of: expiration of a timer associated with the RACH-less procedure, or a timing difference, between a source cell associated with the first BS and a target cell associated with the second BS, that satisfies a threshold. In a sixteenth aspect, alone or in combination with one or more of the first through fifteenth aspects, the timer is configured to multiple periodicities.

In a seventeenth aspect, alone or in combination with one or more of the first through sixteenth aspects, the timer is initiated based at least in part on at least one of: receiving a handover command from the BS, or receiving the pre-allocated UL grant from the BS. In an eighteenth aspect, alone or in combination with one or more of the first through seventeenth aspects, the timer is stopped based at least in part on at least one of: an acknowledgement for the initial PUSCH transmission, or expiration of a T304 timer.

In a nineteenth aspect, alone or in combination with one or more of the first through eighteenth aspects, the timer has a value that is less than a T304 timer. In some aspects, expiration of the timer is associated with performance of contention based random access (CBRA). In a twentieth aspect, alone or in combination with one or more of the first through nineteenth aspects, the UE may receive a radio resource control (RRC) resume message from the first BS prior to receiving the pre-allocated UL grant, and may determine a system frame number (SFN) offset between a master node (MN), associated with the first BS, and a secondary node (SN), associated with the second BS, based at least in part on receiving the RRC resume message.

In a twenty-first aspect, alone or in combination with one or more of the first through twentieth aspects, a timing advance of the SN is equal to a timing advance of the MN minus a difference, between a first propagation delay of the MN and a second propagation delay of the SN, minus the SFN offset. In a twenty-second aspect, alone or in combination with one or more of the first through twenty-first aspects, the first propagation delay and the second propagation delay are associated with a master information block (MIB).

In a twenty-third aspect, alone or in combination with one or more of the first through twenty-second aspects, the UE may store the SFN offset prior to entering an inactive mode. In a twenty-fourth aspect, alone or in combination with one or more of the first through twenty-third aspects, the UE may transmit, to the first B S, an RRC resume complete message based at least in part on receiving the RRC resume message, wherein the RRC resume complete message is associated with causing the first BS to determine that a same last serving secondary node (SN), associated with the first BS, can be configured for the UE. In a twenty-fifth aspect, alone or in combination with one or more of the first through twenty-fourth aspects, the pre-allocated UL grant further includes an indication to re-use a prior SFN offset as the SFN offset.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
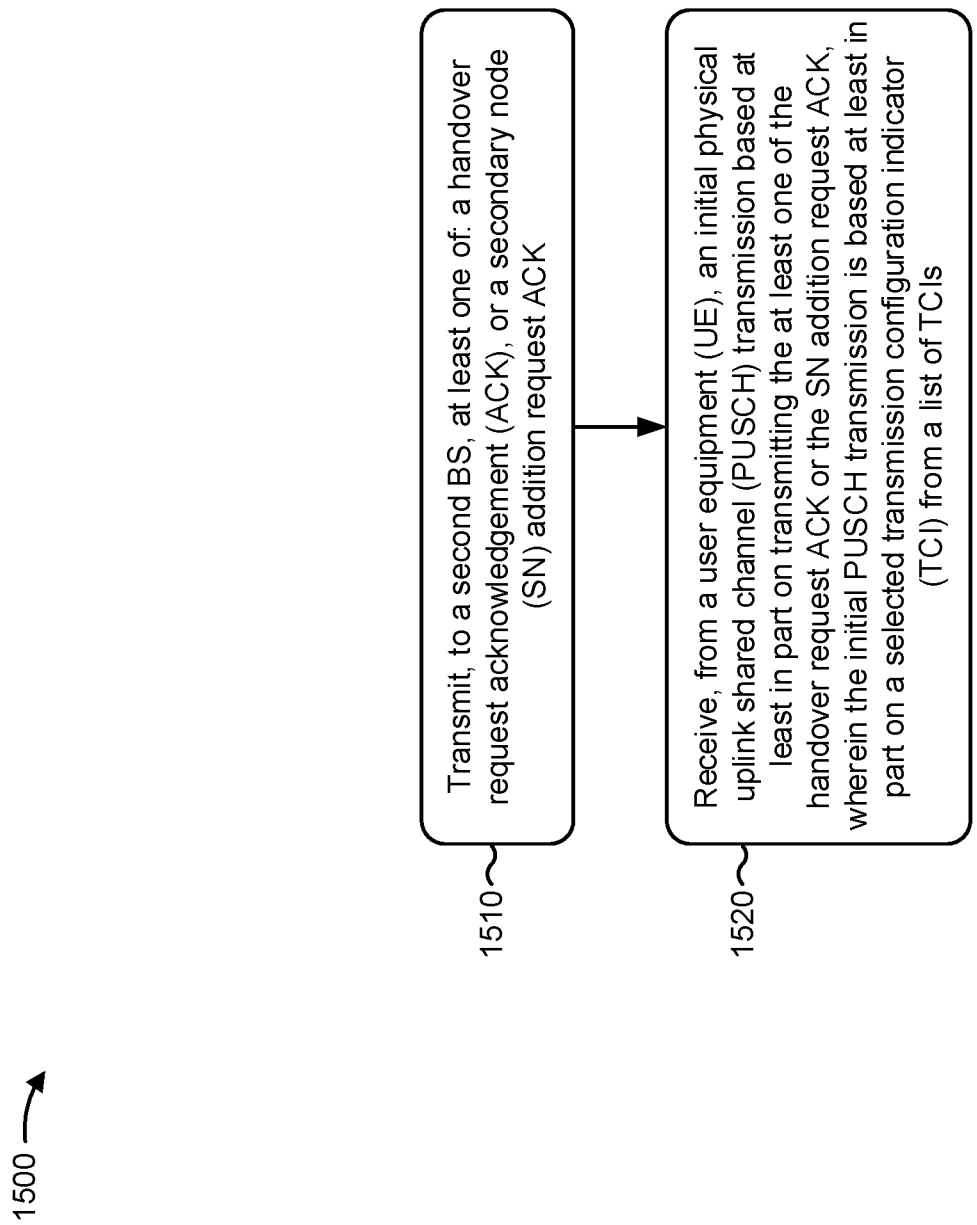
FIG. 15 is a diagram illustrating an example process performed, for example, by a base station, in accordance with various aspects of the present disclosure.

FIG. 15 is a diagram illustrating an example process 1500 performed, for example, by a UE, in accordance with various aspects of the present disclosure. Example process 1500 is an example where a first BS (e.g., BS 110) performs a random access channel (RACH)-less procedure.

As shown in FIG. 15, in some aspects, process 1500 may include transmitting, to a second BS, at least one of: a handover request acknowledgement (ACK), or a secondary node (SN) addition request ACK (block 1510). For example, the first BS (e.g., using controller/processor 240, transmit processor 220, TX MIMO processor 230, MOD 232, antenna 234, and/or the like) may transmit, to a second BS, at least one of: a handover request acknowledgement (ACK), or a secondary node (SN) addition request ACK, as described elsewhere herein.

As further shown in FIG. 15, in some aspects, process 1500 may include receiving, from a user equipment (UE), an initial physical uplink shared channel (PUSCH) transmission based at least in part on transmitting the at least one of the handover request ACK or the SN addition request ACK, wherein the initial PUSCH transmission is based at least in part on a selected transmission configuration indicator (TCI) from a list of TCIs (block 1520). For example, the first BS (e.g., using antenna 234, DEMOD 232, MIMO detector 236, receive processor 238, controller/processor 240, and/or the like) may receive, from a user equipment (UE), an initial physical uplink shared channel (PUSCH) transmission based at least in part on transmitting the at least one of the handover request ACK or the SN addition request ACK, as described elsewhere herein. In some aspects, the initial PUSCH transmission is based at least in part on a selected transmission configuration indicator (TCI) from a list of TCIs.

Process 1500 may include additional aspects, such as any single aspect and/or any combination of aspects described below and/or in connection with one or more other processes described elsewhere herein.

In a first aspect, the first BS is associated with a target cell for the UE, and the second BS is associated with a source cell for the UE. In a second aspect, alone or in combination with the first aspect, the first BS is an SN for the UE, and the second BS is a last serving master node (MN) for the UE.

In a third aspect, alone or in combination with one or more of the first through second aspects, the handover request ACK and the SN addition request ACK are associated with causing the second BS to transmit a pre-allocated uplink (UL) grant to the UE, wherein the pre-allocated UL grant includes: the TCI list for the SN associated with the first BS, and a type 1 configured grant (CG). In a fourth aspect, alone or in combination with one or more of the first through third aspects, the pre-allocated UL grant further includes an indication to re-use a prior system frame number (SFN) offset as an SFN offset.

In a fifth aspect, alone or in combination with one or more of the first through fourth aspects, the pre-allocated UL grant is associated with a radio resource control (RRC) reconfiguration message. In a sixth aspect, alone or in combination with one or more of the first through fifth aspects, the initial PUSCH transmission is further based at least in part on a calculated timing advance of a target cell. In a seventh aspect, alone or in combination with one or more of the first through sixth aspects, the first BS may receive the initial PUSCH transmission in association with a radio resource control (RRC) reconfiguration complete message.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a base station (BS), comprising:
   determining to transmit a pre-allocated uplink (UL) grant to a user equipment (UE), wherein the pre-allocated UL grant includes:

a secondary node (SN) transmission configuration indicator (TCI) list, and a type 1 configured grant (CG);

transmitting, to the UE, the pre-allocated UL grant based at least in part on determining to transmit the pre-allocated UL grant; and releasing the pre-allocated UL grant based on a failure of a random access channel (RACH)-less procedure, wherein the failure of the RACH-less procedure is based at least in part on at least one of:

expiration of a timer associated with the RACH-less procedure, or a timing difference, between a source cell associated with the BS and a target cell associated with another BS, that satisfies a threshold, wherein the timer can be configured to a period no more than that of a T304 timer.

2. The method of claim 1,
wherein the SN TCI list includes information for multiple candidate beams of the target cell, and
wherein the pre-allocated UL grant is included in a radio resource control (RRC) reconfiguration message.

3. The method of claim 1, wherein transmitting the pre-allocated UL grant comprises:
transmitting repetitions of the pre-allocated UL grant based at least in part on determining to transmit the pre-allocated UL grant.

4. The method of claim 1, wherein determining to transmit the pre-allocated UL grant comprises:
determining to transmit the pre-allocated UL grant in association with at least one of:
a handover of the UE,
an addition of an SN,
a change in the SN, or
a handover request acknowledgement (ACK).

5. The method of claim 1,
wherein transmitting the pre-allocated UL grant comprises:
transmitting the pre-allocated UL grant in association with a handover command, and
wherein the SN TCI list is associated with selecting a beam via which the UE is to transmit an initial physical uplink shared channel (PUSCH) transmission.

6. The method of claim 1, wherein a source of quasi-collocation (QCL) information associated with the SN TCI list is based at least in part on at least one of:
a synchronization signal and physical broadcast channel block (SSB), or
a channel state information reference signal (CSI-RS) associated with a beam spatial direction in which the UE is to send a physical uplink shared channel (PUSCH) transmission in the target cell.

7. The method of claim 1, wherein the pre-allocated UL grant further includes at least one of:
information that identifies a grant scheduling interval,
information that identifies a quantity of configured hybrid automatic repeat request (HARQ) processes to be used, or
information related to power control for respective reference signals (RSs) quasi-collocated with TCIs included in the SN TCI list.

8. The method of claim 1, wherein determining to transmit the pre-allocated UL grant comprises:
determining to transmit the pre-allocated UL grant based at least in part on receiving an SN addition request acknowledgement (ACK), wherein the BS is a last serving master node (MN).

9. The method of claim 8, further comprising:
transmitting, to an SN, an SN reconfiguration complete message based at least in part on transmitting the pre-allocated UL grant,
wherein the SN reconfiguration complete message is associated with the SN addition request ACK.

10. The method of claim 1, wherein the timer is configured to multiple periodicities.

11. The method of claim 1,
wherein the timer is initiated based at least in part on at least one of:
transmitting a handover command to the UE, or
transmitting the pre-allocated UL grant to the UE, and
wherein the timer is stopped based at least in part on at least one of:
an acknowledgement for an initial physical uplink shared channel (PUSCH) transmission, or
expiration of the T304 timer.

12. The method of claim 1, further comprising:
transmitting a radio resource control (RRC) resume message to the UE prior to determining to transmit the pre-allocated UL grant,
wherein the RRC resume message is associated with causing the UE to determine a system frame number (SFN) offset between a master node (MN), associated with the BS, and a secondary node (SN) associated with the other BS.

13. The method of claim 12, wherein a timing advance of the SN is equal to a timing advance of the MN minus a difference, between a first propagation delay of the MN and a second propagation delay of the SN, minus the SFN offset.

14. The method of claim 12, further comprising:
determining that a same last serving SN can be configured for the UE after transmitting the RRC resume message and prior to determining to transmit the pre-allocated UL grant; and
receiving an SN addition request acknowledgement (ACK) from the same last serving SN after determining that the same last serving SN can be configured for the UE.

15. The method of claim 14, wherein transmitting the pre-allocated UL grant comprises:
transmitting the pre-allocated UL grant based at least in part on receiving the SN addition request ACK,
wherein the pre-allocated UL grant further includes an indication to re-use a prior SFN offset as the SFN offset.

16. A method of wireless communication performed by a user equipment (UE), comprising:
receiving a pre-allocated uplink (UL) grant from a first base station (BS), wherein the pre-allocated UL grant includes:
a secondary node (SN) transmission configuration indicator (TCI) list, and
a type 1 configured grant (CG);
measuring a first propagation delay associated with the first BS and a second propagation delay associated with a second BS based at least in part on receiving the pre-allocated UL grant;
calculating a timing advance of a target cell based at least in part on measuring the first propagation delay and the second propagation delay; and
transmitting, to the second BS, an initial physical uplink shared channel (PUSCH) transmission based at least in part on receiving the pre-allocated UL grant, wherein the initial PUSCH transmission is based at least in part on the timing advance and a selected TCI from the SN TCI list.

17. The method of claim 16,
wherein receiving the pre-allocated UL grant comprises:
receiving the pre-allocated UL grant in association with a RRC resume command, and
wherein the SN TCI list is associated with selecting a beam via which the UE is to transmit the initial PUSCH transmission.

18. The method of claim 16, wherein a source of quasi-collocation (QCL) information associated with the SN TCI list is based at least in part on at least one of:
a synchronization signal and physical broadcast channel block (SSB), or
a channel state information reference signal (CSI-RS) associated with a beam spatial direction in which the UE is to send the initial PUSCH transmission.

19. The method of claim 16, further comprising:
selecting the selected TCI from a set of TCIs of the SN TCI list, wherein respective quasi-collocations (QCLs) for the set of TCIs satisfy a threshold.

20. The method of claim 16, further comprising:
releasing the pre-allocated UL grant based on a failure of a random access channel (RACH)-less procedure,
wherein the failure of the RACH-less procedure is based at least in part on at least one of:
expiration of a timer associated with the RACH-less procedure, or
a timing difference, between a source cell associated with the first BS and the target cell, that satisfies a threshold.

21. The method of claim 20,
wherein the timer is initiated based at least in part on at least one of:
receiving a handover command from the BS, or
receiving the pre-allocated UL grant from the BS, and
wherein the timer is stopped based at least in part on at least one of:
an acknowledgement for the initial PUSCH transmission, or
expiration of a T304 timer.

22. A method of wireless communication performed by a user equipment (UE), comprising:
receiving a radio resource control (RRC) resume message from a first base station (BS) prior to receiving a pre-allocated uplink (UL) grant;
determining a system frame number (SFN) offset between a master node (MN), associated with the first BS, and a secondary node (SN), associated with a second BS, based at least in part on receiving the RRC resume message;
receiving the pre-allocated UL grant from the first BS, wherein the pre-allocated UL grant includes:
a SN transmission configuration indicator (TCI) list, and
a type 1 configured grant (CG); and
transmitting, to the second BS, an initial physical uplink shared channel (PUSCH) transmission based at least in part on receiving the pre-allocated UL grant,
wherein the initial PUSCH transmission is based at least in part on the SFN offset and a selected TCI from the SN TCI list.

23. The method of claim 22, further comprising:
storing the SFN offset prior to entering an inactive mode.

24. The method of claim 22, further comprising:
transmitting, to the first BS, an RRC resume complete message based at least in part on receiving the RRC resume message,
wherein the RRC resume complete message is associated with causing the first BS to determine that a same last serving SN, associated with the first BS, can be configured for the UE.

25. A method of wireless communication performed by a first base station (BS), comprising:
transmitting, to a second BS, at least one of:
a handover request acknowledgement (ACK), or
a secondary node (SN) addition request ACK; and
receiving, from a user equipment (UE), an initial physical uplink shared channel (PUSCH) transmission based at least in part on transmitting the at least one of the handover request ACK or the SN addition request ACK,
wherein the initial PUSCH transmission is based at least in part on a selected transmission configuration indicator (TCI) from a list of TCIs and is further based at least in part on a calculated timing advance of a target cell,
wherein at least one of the handover request ACK or the SN addition request ACK is associated with causing the second BS to transmit a pre-allocated uplink (UL) grant to the UE, and
wherein the pre-allocated UL grant includes:
the TCI list for the SN associated with the first BS, and
a type 1 configured grant (CG).

26. The method of claim 25, wherein receiving the initial PUSCH transmission comprises:
receiving the initial PUSCH transmission in association with a radio resource control (RRC) reconfiguration complete message.

27. A user equipment (UE) for wireless communication, comprising:
one or more memories; and
one or more processors, coupled to the one or more memories, configured to:
receive a pre-allocated uplink (UL) grant from a first base station (BS), wherein the pre-allocated UL grant includes:
a secondary node (SN) transmission configuration indicator (TCI) list, and
a type 1 configured grant (CG);
measure a first propagation delay associated with the first BS and a second propagation delay associated with a second BS based at least in part on receiving the pre-allocated UL grant;
calculate a timing advance of a target cell based at least in part on measuring the first propagation delay and the second propagation delay; and
transmit, to the second BS, an initial physical uplink shared channel (PUSCH) transmission based at least in part on receiving the pre-allocated UL grant, wherein the initial PUSCH transmission is based at least in part on the timing advance and a selected TCI from the SN TCI list.

* * * * *